(12) United States Patent
Yoshida et al.

(10) Patent No.: US 11,917,110 B2
(45) Date of Patent: Feb. 27, 2024

(54) IMAGE PROCESSING APPARATUS DISPLAYING HISTORY OF JOBS EXECUTED BY JOB EXECUTION UNIT AND METHOD FOR CONTROLLING IMAGE PROCESSING APPARATUS

(71) Applicant: SHARP KABUSHIKI KAISHA, Sakai (JP)

(72) Inventors: Mayuko Yoshida, Osaka (JP); Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/845,684

(22) Filed: Jun. 21, 2022

(65) Prior Publication Data

US 2022/0417372 A1 Dec. 29, 2022

(30) Foreign Application Priority Data

Jun. 25, 2021 (JP) ................. 2021-106010

(51) Int. Cl.
*H04N 1/00* (2006.01)

(52) U.S. Cl.
CPC ....... *H04N 1/00413* (2013.01); *H04N 1/0097* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,392,132 B1* | 7/2016 | Iwasaki | H04N 1/00413 |
| 2010/0128309 A1 | 5/2010 | Matoba | |
| 2014/0019914 A1* | 1/2014 | Amano | H04N 1/00474 |
| | | | 715/825 |
| 2015/0288836 A1* | 10/2015 | Kanki | H04N 1/00514 |
| | | | 358/1.13 |
| 2016/0117178 A1* | 4/2016 | Amano | G06F 9/453 |
| | | | 715/708 |
| 2019/0014228 A1* | 1/2019 | Kamoi | G06K 15/005 |
| 2019/0297211 A1* | 9/2019 | Tanaka | H04N 1/00708 |
| 2019/0306349 A1* | 10/2019 | Shino | H04N 1/00514 |
| 2019/0346980 A1* | 11/2019 | Sano | G06F 3/0488 |
| 2019/0384552 A1* | 12/2019 | Sakaguchi | G06F 3/1254 |
| 2020/0249891 A1* | 8/2020 | Kawakami | G06F 3/1273 |
| 2020/0296238 A1* | 9/2020 | Nishiyama | H04N 1/00474 |
| 2022/0191335 A1* | 6/2022 | Itai | H04N 1/0097 |

FOREIGN PATENT DOCUMENTS

JP 2010-130245 A 6/2010

* cited by examiner

*Primary Examiner* — Henok Shiferaw
(74) *Attorney, Agent, or Firm* — ScienBiziP, P.C.

(57) ABSTRACT

An image processing apparatus including: a job executor; a storage that stores therein history information related to execution of jobs; and a controller that sets a display priority of the history information based on an operation mode of the job executor when calling up the history information.

7 Claims, 19 Drawing Sheets

FIG. 3

| HISTORY INFORMATION | | | | |
|---|---|---|---|---|
| JOB ID | EXECUTION DATE AND TIME | WORKING MODE (JOB TYPE) | OPERATION MODE | SETTING VALUE |
| 1 | 2020/04/01 16:20 | COPY | EASY | COLOR MODE:FULL COLOR, DOCUMENT:AUTO, PAPER SELECTION:TRAY 1, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:1 COPY,..... |
| 4 | 2020/04/01 14:40 | COPY | NORMAL | COLOR MODE:FULL COLOR, DOCUMENT:AUTO, PAPER SELECTION:AUTO, DUPLEX COPY:SINGLE-SIDED TO DOUBLE-SIDED, MAGNIFICATION:100%, COPY DENSITY:AUTO, SORT/GROUP:AUTO, STAPLE/PUNCH:OFF, NUMBER OF COPIES:1 COPY,..... |
| 5 | 2020/04/01 14:05 | COPY | NORMAL | COLOR MODE:BLACK AND WHITE, DOCUMENT:AUTO, PAPER SELECTION:AUTO, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:1 COPY,..... |
| 6 | 2020/04/01 13:50 | COPY | EASY | COLOR MODE:FULL COLOR, DOCUMENT:AUTO, PAPER SELECTION:TRAY 1, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:3 COPIES,..... |
| 7 | 2020/04/01 12:20 | COPY | NORMAL | COLOR MODE:BLACK AND WHITE, DOCUMENT:AUTO, PAPER SELECTION:TRAY 1, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:1 COPY,..... |
| 9 | 2020/04/01 11:50 | COPY | EASY | COLOR MODE:FULL COLOR, DOCUMENT:AUTO, PAPER SELECTION:MANUAL FEED, DUPLEX COPY:SINGLE-SIDED TO DOUBLE-SIDED, MAGNIFICATION:100%, COPY DENSITY:AUTO, SORT/GROUP:AUTO, STAPLE/PUNCH:OFF, NUMBER OF COPIES:1 COPY,..... |
| 12 | 2020/04/01 10:15 | COPY | EASY | COLOR MODE:FULL COLOR, DOCUMENT:AUTO, PAPER SELECTION:TRAY 1, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:1 COPY,..... |
| 14 | 2020/04/01 09:40 | COPY | EASY | COLOR MODE:FULL COLOR, DOCUMENT:AUTO, PAPER SELECTION:TRAY 1, DUPLEX COPY:SINGLE-SIDED TO DOUBLE-SIDED, MAGNIFICATION:100%, COPY DENSITY:AUTO, SORT/GROUP:AUTO, STAPLE/PUNCH:OFF, NUMBER OF COPIES:1 COPY,..... |
| 17 | 2020/04/01 08:30 | COPY | NORMAL | COLOR MODE:FULL COLOR, DOCUMENT:AUTO, PAPER SELECTION:AUTO, DUPLEX COPY:SINGLE-SIDED TO SINGLE-SIDED, MAGNIFICATION:100%, COPY DENSITY:AUTO, SORT/GROUP:AUTO, STAPLE/PUNCH:OFF, NUMBER OF COPIES:1 COPY,..... |
| 20 | 2020/04/01 08:10 | COPY | NORMAL | COLOR MODE:FULL COLOR, DOCUMENT:AUTO, PAPER SELECTION:MANUAL FEED, DUPLEX COPY:SINGLE-SIDED TO SINGLE-SIDED, MAGNIFICATION:80%, COPY DENSITY:AUTO, SORT/GROUP:AUTO, STAPLE/PUNCH:OFF, NUMBER OF COPIES:1 COPY,..... |

FIG. 4

HISTORY INFORMATION

| JOB ID | EXECUTION DATE AND TIME | WORKING MODE (JOB TYPE) | OPERATION MODE | SETTING VALUE |
|---|---|---|---|---|
| 2 | 2020/04/01 16:15 | SCAN | EASY | COLOR MODE:AUTO/BLACK AND WHITE BINARY, RESOLUTION:200dpix200dpi, FORMAT:PDF, DOCUMENT:SINGLE-SIDED TO SINGLE-SIDED, DENSITY:AUTO, DESTINATION:aaaaa@sample.com; bbbbb@sample.com;····· |
| 3 | 2020/04/01 16:02 | SCAN | EASY | COLOR MODE:AUTO/BLACK AND WHITE BINARY, RESOLUTION:200dpix200dpi, FORMAT:PDF, DOCUMENT:SINGLE-SIDED TO SINGLE-SIDED, DENSITY:AUTO, DESTINATION:Local disk,····· |
| 8 | 2020/04/01 12:00 | E-mail | NORMAL | COLOR MODE:AUTO/BLACK AND WHITE BINARY, RESOLUTION:200dpix200dpi, FORMAT:PDF, DOCUMENT:SINGLE-SIDED TO SINGLE-SIDED, DENSITY:AUTO, DESTINATION:ccccc@sample.com,····· |
| 10 | 2020/04/01 11:30 | SCAN | EASY | COLOR MODE:FULL COLOR, RESOLUTION:400dpix400dpi, FORMAT:JPEG, DOCUMENT:SINGLE-SIDED TO SINGLE-SIDED, DENSITY:AUTO, DESTINATION:Local disk; USB,····· |
| 11 | 2020/04/01 10:20 | E-mail | NORMAL | COLOR MODE:FULL COLOR, RESOLUTION:200dpix200dpi, FORMAT:PDF, DOCUMENT:SINGLE-SIDED TO SINGLE-SIDED, DENSITY:AUTO, DESTINATION:ddddd@sample.com;····· |
| 13 | 2020/04/01 10:05 | E-mail | NORMAL | COLOR MODE:AUTO/BLACK AND WHITE BINARY, RESOLUTION:200dpix200dpi, FORMAT:PDF, DOCUMENT:SINGLE-SIDED TO SINGLE-SIDED, DENSITY:AUTO, DESTINATION:eeeee@sample.com,····· |
| 15 | 2020/04/01 09:30 | SCAN | EASY | COLOR MODE:FULL COLOR, RESOLUTION:400dpix400dpi, FORMAT:JPEG, DOCUMENT:SINGLE-SIDED TO SINGLE-SIDED, DENSITY:AUTO, DESTINATION:USB,····· |
| 16 | 2020/04/01 09:10 | E-mail | NORMAL | COLOR MODE:FULL COLOR, RESOLUTION:200dpix200dpi, FORMAT:PDF, DOCUMENT:SINGLE-SIDED TO SINGLE-SIDED, DENSITY:AUTO, DESTINATION:ggggg@sample.com,····· |
| 18 | 2020/04/01 08:20 | SCAN | EASY | COLOR MODE:FULL COLOR, RESOLUTION:200dpix200dpi, FORMAT:PDF, DOCUMENT:SINGLE-SIDED TO SINGLE-SIDED, DENSITY:AUTO, DESTINATION:hhhhh@sample.com,····· |
| 19 | 2020/04/01 08:15 | E-mail | NORMAL | COLOR MODE:FULL COLOR, RESOLUTION:400dpix400dpi, FORMAT:TIFF, DOCUMENT:SINGLE-SIDED TO SINGLE-SIDED, DENSITY:AUTO, DESTINATION:aaaaa@sample.com; ccccc@sample.com,····· |

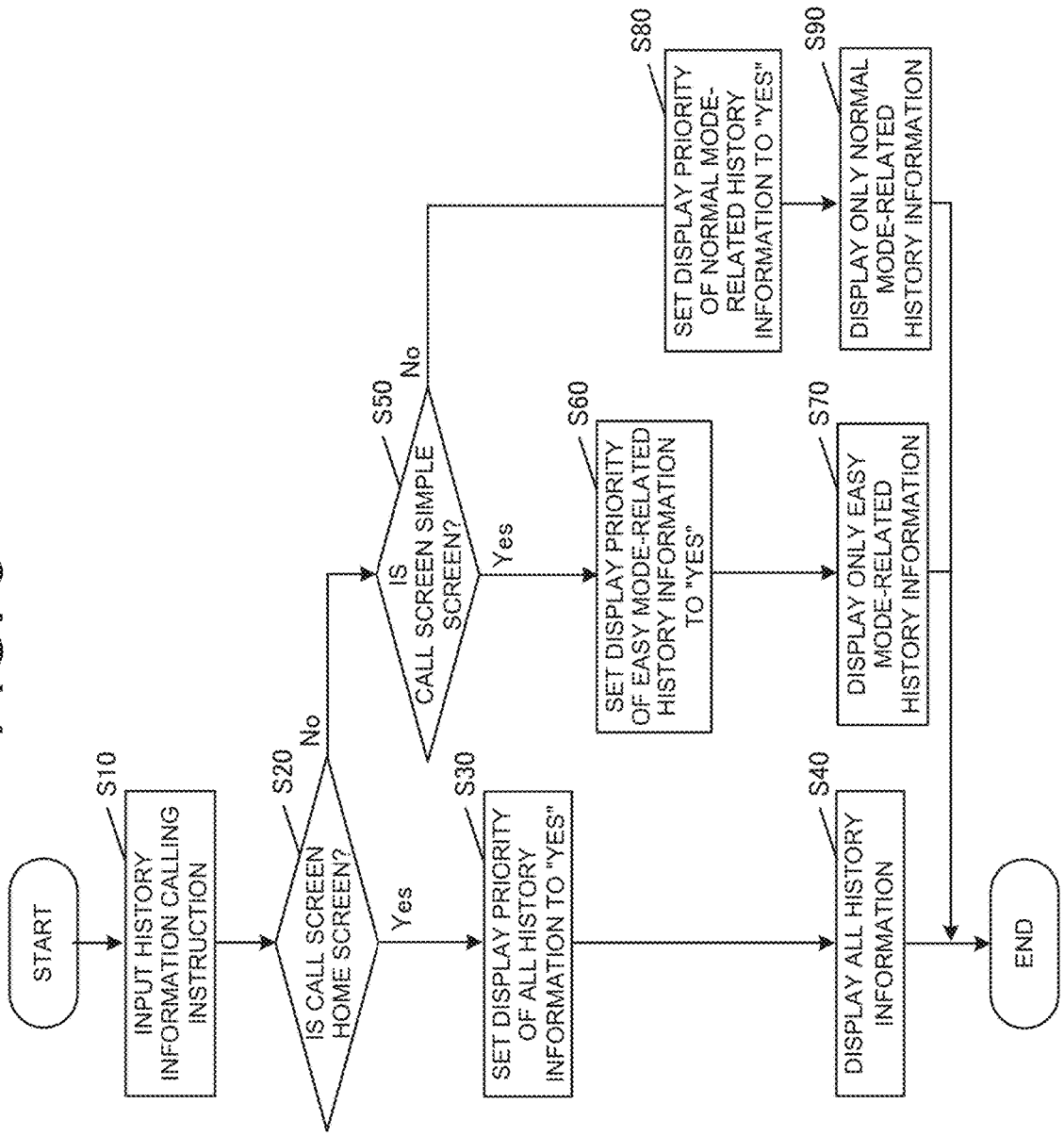

| COPY | | | | | SYSTEM INFORMATION | JOB STATUS |

RECENT JOB — SELECT JOB TO CALL UP HISTORY INFORMATION. — NARROW DOWN ALL COPY JOBS — DELETE

ALL — COPY — TRANSMISSION/SAVING

| EASY COPY | 16:20 04/01 | TRAY 1 | SINGLE-SIDED TO SINGLE-SIDED | OFF |
| COPY | 14:40 04/01 | AUTO | SINGLE-SIDED TO SINGLE-SIDED | OFF |
| COPY | 14:05 04/01 | AUTO | SINGLE-SIDED TO SINGLE-SIDED | OFF |
| EASY COPY | 13:50 04/01 | TRAY 1 | SINGLE-SIDED TO SINGLE-SIDED | OFF |
| COPY | 12:20 04/01 | TRAY 1 | SINGLE-SIDED TO SINGLE-SIDED | OFF |

| TRANSMISSION/SAVING | | SYSTEM INFORMATION | JOB STATUS |

RECENT JOB — SELECT JOB TO CALL UP HISTORY INFORMATION. — NARROW DOWN ALL TRANSMISSION/SAVING — DELETE

ALL — COPY — TRANSMISSION/SAVING

| EASY SCAN | 16:15 04/01 | DESTINATION: aaaaa@sample@com; bbbbb@sample.com |
| EASY SCAN | 16:02 04/01 | DESTINATION: Local disk |
| E-mail | 12:00 04/01 | DESTINATION: ccccc@sample.com |
| EASY SCAN | 11:30 04/01 | DESTINATION: Local disk, USB |
| E-mail | 10:20 04/01 | DESTINATION: ddddd@sample.com |

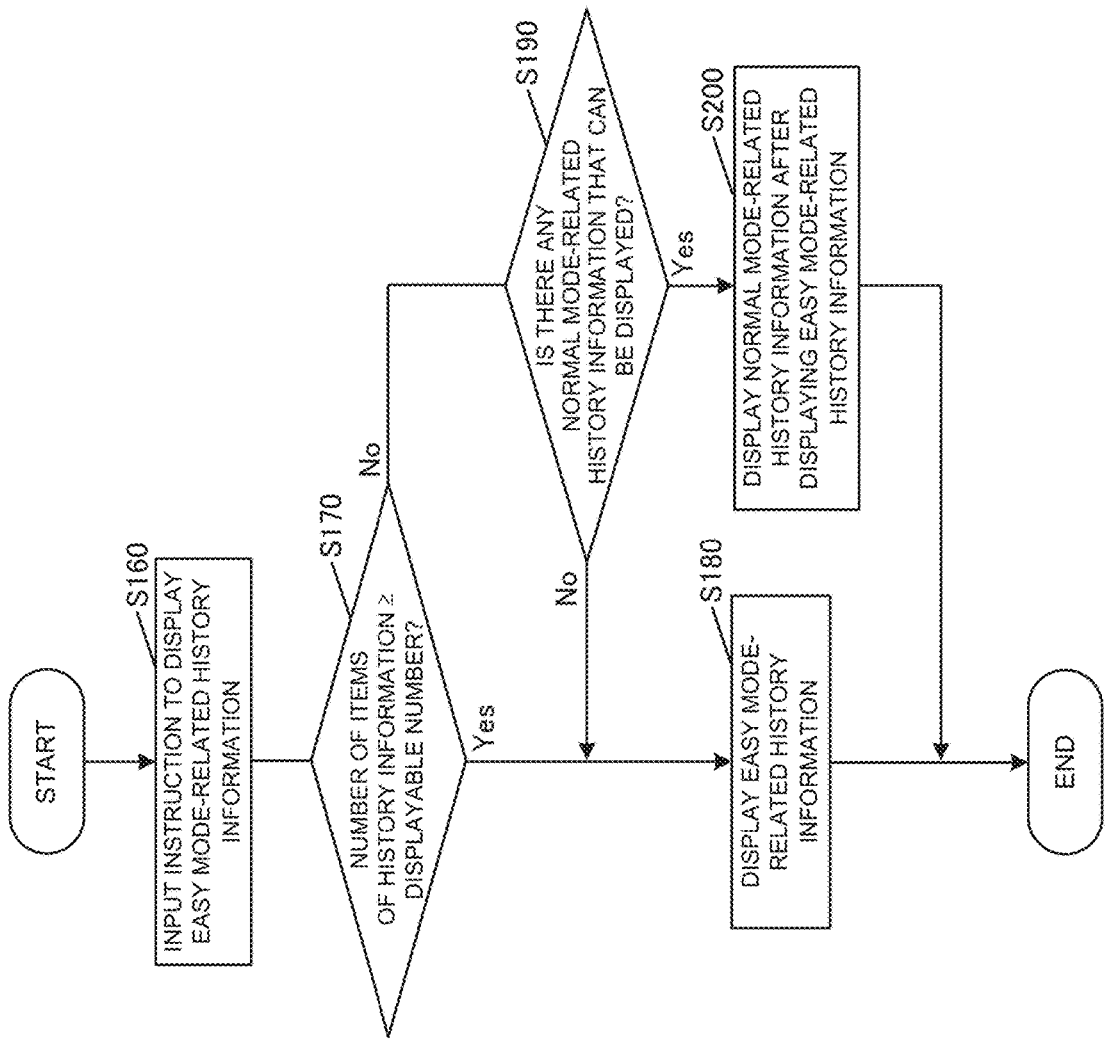

FIG. 19A
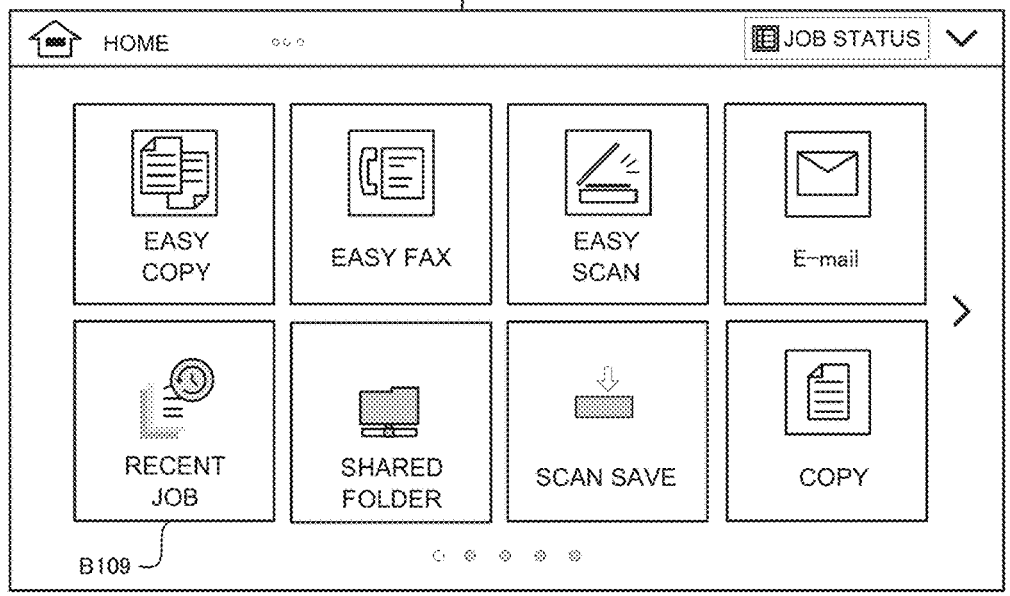
FIG. 19B
FIG. 19C
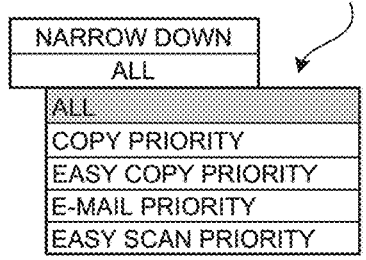

IMAGE PROCESSING APPARATUS DISPLAYING HISTORY OF JOBS EXECUTED BY JOB EXECUTION UNIT AND METHOD FOR CONTROLLING IMAGE PROCESSING APPARATUS

BACKGROUND OF THE INVENTION

Field of the Invention

The present disclosure relates to an image processing apparatus and the like.

Description of the Background Art

Some image processing apparatuses such as multifunction peripherals store history information including setting values related to execution of jobs in a callable manner.

A user wishing to execute a new job can reduce the effort involved in the execution of the new job by calling up and reusing desired history information, and making some changes to setting values as needed.

For example, an image forming apparatus is known, which manages a job setting screen and job history information. When the image forming apparatus displays a setting screen for a new job using a job history, settings contained in the job history information are reflected in the setting screen.

A user calls up history information through a history information display screen, which displays history information in a predetermined manner. The user can call up desired history information by selecting the desired history information from the history information displayed on the history information display screen.

However, most conventional techniques merely allow presentation of a list of history information in the order of job execution (in the order the history information was stored). The user may have difficulty retrieving and selecting the desired history information in a case where, for example, there is a large amount of history information or there are jobs executed with the working mode frequently switched between different working modes such as a copy working mode and an image transmission working mode.

An object of the present disclosure is to provide an image processing apparatus and the like that allows for an improvement in the convenience of history information retrieval and selection in history information calling.

SUMMARY OF THE INVENTION

In order to solve the problem described above, the present disclosure provides an image processing apparatus including: a job executor; a storage that stores therein history information related to execution of jobs; and a controller that sets a display priority of the history information based on an operation mode of the job executor when calling up the history information.

The present disclosure also provides a method for controlling an image processing apparatus including a job executor, a storage, and a controller, the method including: storing history information related to execution of jobs in the storage; and setting a display priority of the history information based on an operation mode of the job executor when the controller calls up the history information.

According to the present disclosure, it is possible to provide an image processing apparatus and the like that allows for an improvement in the convenience of history information retrieval and selection in history information calling.

BRIEF DESCRIPTION OF THE DRAWINGS

FIG. 3 is a diagram for explaining a configuration example of history information.

FIG. 4 is a diagram for explaining a configuration example of history information.

FIG. 5 is a flowchart for illustrating a flow of processing according to the first embodiment.

FIGS. 15A and 15B are diagrams for illustrating an operation example according to the second embodiment.

FIG. 17 is a flowchart for illustrating a flow of processing according to a third embodiment.

FIGS. 19A to 19C are diagrams for illustrating an operation example according to the third embodiment.

DESCRIPTION OF THE PREFERRED EMBODIMENTS

Hereinafter, embodiments of the present disclosure will be described with reference to the accompanying drawings. The following describes, as an image processing apparatus according to an embodiment of the present disclosure, a multifunction peripheral that executes jobs under different working modes such as a copy working mode and an image transmission working mode. The embodiments described below are examples for explaining the present disclosure, and the technical scope of the description set forth in the claims is not limited to the following description.

1. First Embodiment

In history information calling according to a first embodiment, targeted history information is displayed through narrowing.

1.1. Functional Configuration

Figure 1:
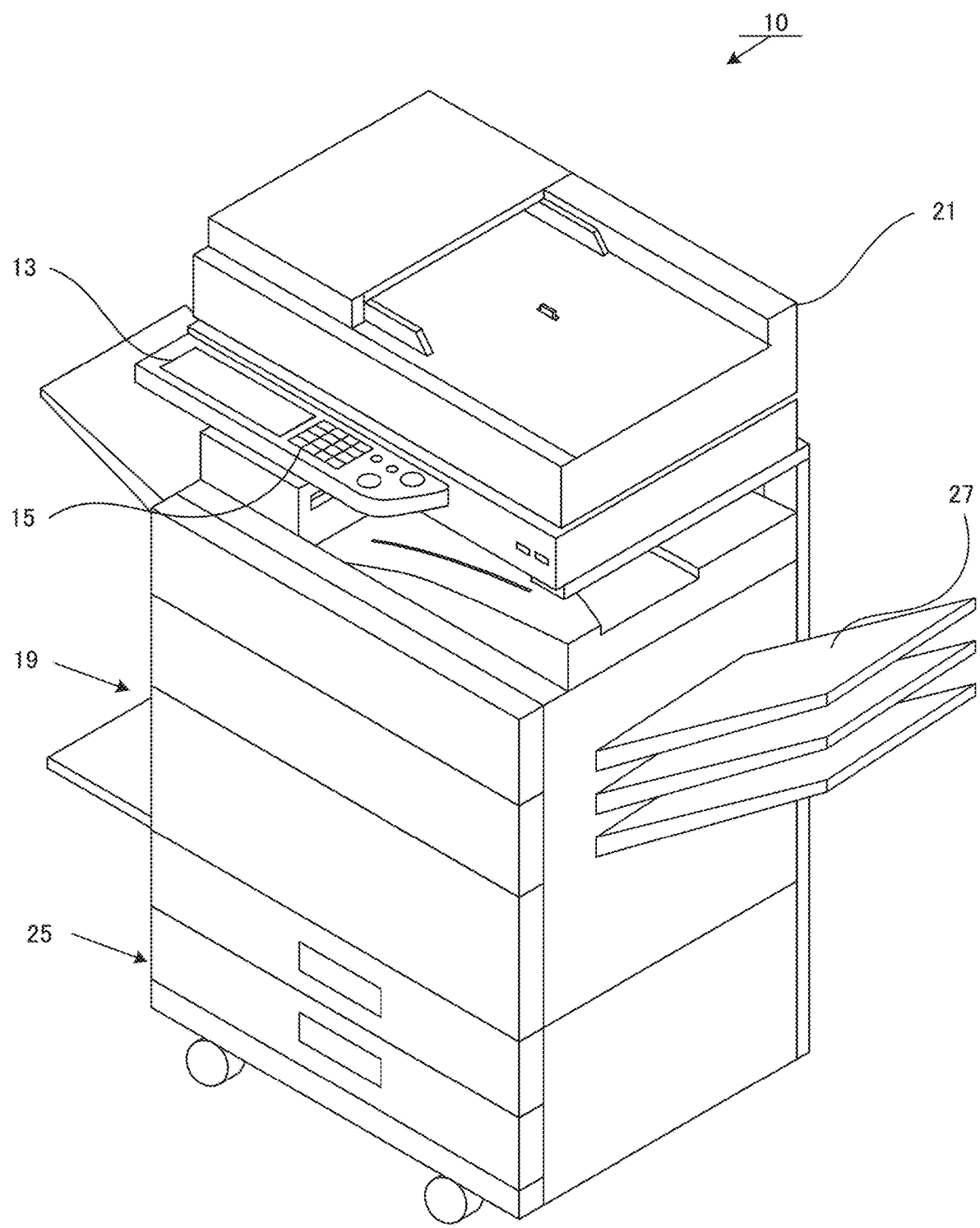
FIG. 1 is an external perspective view of a multifunction peripheral according to a first embodiment.
Figure 2:
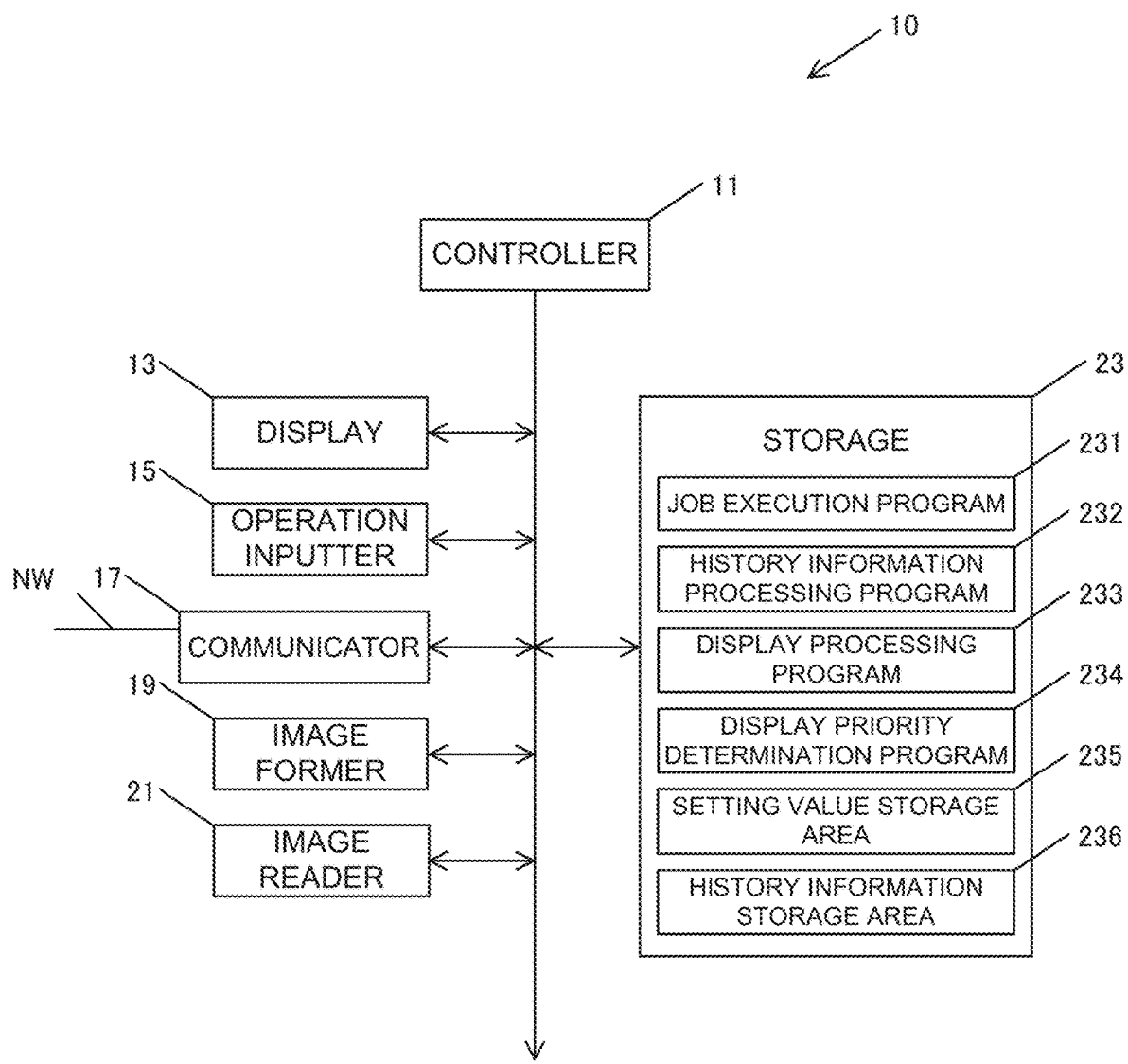
FIG. 2 is a diagram for illustrating a functional configuration of the multifunction peripheral according to the first embodiment.

FIG. 1 is an external perspective view illustrating an overall configuration of a multifunction peripheral 10 according to the first embodiment. FIG. 2 is a diagram for illustrating a functional configuration of the multifunction peripheral 10. The multifunction peripheral 10 includes a controller 11, a display 13, an operation inputter 15, a communicator 17, an image former 19, an image reader 21, and a storage 23.

The controller 11 performs overall control of the multifunction peripheral 10. The controller 11 includes, for example, one or more computing devices (for example, central processing unit: CPU). The controller 11 implements functions thereof by calling up and executing various programs stored in the storage 23.

The display 13 displays various information to, for example, a user. The display 13 may include, for example, a liquid crystal display (LCD) or an organic electro-luminescence (EL) display.

The operation inputter 15 receives information inputted by, for example, the user. The operation inputter 15 may include, for example, hard keys (for example, numeric keypad) and buttons. The operation inputter 15 can be configured as a touch panel that allows input via the display 13. In this case, for example, a method such as a resistive method, an infrared method, an inductive method, or a capacitive method may be employed as an input method for the touch panel.

The communicator 17 includes, for example, either or both of a wired interface and a wireless interface for communication with other devices via a network (NW) such as a local area network (LAN), a wide area network (WAN), the Internet, a telephone line, or a fax line.

The image former 19 forms an image based on image data on paper, which is a recording medium. The image former 19 feeds paper from a paper feeder 25, forms an image based on the image data on the paper, and then discharges the paper to a paper discharger 27. The image former 19 may include, for example, a laser printer adopting an electrophotographic method. The image former 19 forms images using toners supplied from toner cartridges, not shown, corresponding to respective toner colors (for example, cyan (C), magenta (M), yellow (Y), and black (K)).

The image reader 21 generates image data by scanning and reading a document image to be read. The image reader 21 may be, for example, configured as a scanner device having an image sensor such as a charge coupled device (CCD) or a contact image sensor (CIS). No limitations are placed on the configuration of the image reader 21 as long as the image reader 21 is configured to generate image data by reading a reflected light image resulting from a document image using an image sensor.

The storage 23 stores therein various types of data and various types of programs necessary for operation of the multifunction peripheral 10. The storage 23 may include, for example, a storage device such as random access memory (RAM), a hard disk drive (HDD), a solid state drive (SSD), or read only memory (ROM).

In the first embodiment, the storage 23 stores therein a job execution program 231, a history information processing program 232, a display processing program 233, and a display priority determination program 234. In the storage 23, a setting value storage area 235 and a history information storage area 236 are reserved.

The controller 11 calls up the job execution program 231 when executing a job under any of different working modes such as a copy working mode and an image transmission working mode. The controller 11 that has called up the job execution program 231 executes the job by controlling job executors, such as the display 13, the operation inputter 15, the communicator 17, the image former 19, and the image reader 21, that are involved in the execution of the job under the working mode. The controller 11 that has called up the job execution program 231 executes various jobs based on setting values contained in history information.

The controller 11 calls up the history information processing program 232 when, for example, acquiring setting values related to execution of jobs, generating history information, and performing various types of processing on the history information. The controller 11 that has called up the history information processing program 232 acquires setting values related to execution of jobs and stores the acquired setting values in the setting value storage area 235. The controller 11 also generates history information based on the acquired setting values and stores the generated history information in the history information storage area 236.

The controller 11 calls up the display processing program 233 when displaying a history information display screen for displaying history information, a setting screen for receiving inputs of various setting values related to execution of jobs, or a home screen for receiving, for example, switching between the different working modes. The controller 11 that has called up the display processing program 233 displays history information on the history information display screen based on a display priority, which is described below.

The controller 11 calls up the display priority determination program 234 when calling up history information. The controller 11 that has called up the display priority determination program 234 sets, according to predetermined conditions in the history information calling, the display priority of history information to be displayed on the history information display screen. The display priority according to the present disclosure can be described as an identifier indicating whether the history information is "displayable (YES)" or "not displayable (NO)" on the history information display screen according to the predetermined conditions. No particular limitations are placed on the identifier. For example, the identifier may be set to a value "1" if the history information is "displayable" and set to a value "0" if the history information is "not displayable". These values may be reversed. Alternatively, the display priority may be a flag indicating that the history information is "displayable". According to the first embodiment, the controller 11 that has called up the display priority determination program 234 sets the display priority based on an operation mode of the job executors under the specified working mode when calling up history information. Note that the operation mode will be described below.

In the setting value storage area 235, setting values related to execution of jobs are stored. Examples of setting values include user-settable values and apparatus default values maintained by the apparatus, such as setting values for color mode, document, paper selection, resolution, format, and density.

In the history information storage area 236, history information is stored in a data table format, for example. The history information according to the present disclosure may be, for example, obtained by combining information related to an execution history of a job, such as an execution date and time, a working mode (job type), and an operation mode, with some or all of the setting values stored in the setting value storage area 235, and assigning an identifier to the combined information, such as a job ID for uniquely identifying the combined information. The controller 11 calls up the history information stored in the history information storage area 236 as necessary when displaying the history information on the history information screen or when executing a job based on the history information.

The following describes the history information according to the present disclosure using FIGS. 3 and 4. FIGS. 3 and 4 are each a diagram for explaining a configuration example of the history information. For convenience of explanation, history information related to jobs executed in the copy working mode (FIG. 3) and history information related to jobs executed in the image transmission working mode (FIG. 4) are shown separately. However, the history information shown in FIG. 3 and the history information shown in FIG. 4 are a list of history information related to jobs executed in any of the copy working mode and the image transmission working mode in descending order of job ID.

Job ID "1" in FIG. 3 is an example of history information related to a job executed in the copy working mode. The history information having job ID "1" includes, as information on an execution history, "2020/04/01 16:20" as execution date and time, "copy" as working mode (job type), and "easy" as operation mode. Note here that the value of the operation mode indicates in which operation mode the job executors executed the job under the specified working mode. Specifically, the value of the operation mode indicates a normal mode, which is a normal operation mode with the use of a normal screen, or an easy mode, which is an easy operation mode with the use of a simple screen obtained through simplification of the normal screen.

The history information having job ID "1" further includes, for example, the following setting values: "full color" as color mode, "auto" as document, "tray 1" as paper selection, "single-sided to single-sided" as duplex copy, "100%" as magnification, "auto" as copy density, "auto" as sort/group, "off" as staple/punch, and "1 copy" as number of copies. These setting values for the copy working mode are merely examples, and the setting values according to the present disclosure are not limited to the setting values shown in FIG. 3.

Job ID "2" in FIG. 4 is an example of history information related to a job executed in the image transmission working mode. The history information having job ID "2" includes, as information on an execution history, "2020/04/01 16:15" as execution date and time, "scan" as working mode (job type), and "easy" as operation mode. Note that the image transmission working mode according to the present disclosure includes an easy scan working mode and an e-mail working mode. In this example, the value of the operation mode indicates in which operation mode the job executors executed the job. Specifically, the value of the operation mode indicates a normal mode, which is an operation mode with the use of a normal screen, under the e-mail working mode, or an easy scan mode, which is an operation mode with the use of a simple screen for scanning obtained through simplification of the normal screen, under the easy scan working mode.

The history information having job ID "2" further includes, for example, the following setting values: "auto/black and white binary" as color mode, "200 dpi×200 dpi" as resolution, "pdf" as format, "single-sided to single-sided" as document, "auto" as density, and "aaaaa@sample.com; bbbbb@sample.com" as destination. These setting values for the image transmission working mode are merely examples, and the setting values according to the present disclosure are not limited to the setting values shown in FIG. 4.

The identifier representing the display priority may be included in the history information as part of the setting values, or may be, for example, associated with a job ID and managed using a management table, not shown, separately from the setting values.

1.2. Flow of Processing

Next, a flow of processing according to the first embodiment will be described. FIG. 5 is a flowchart for illustrating processing to be performed by the multifunction peripheral 10. Note that the following description is based on an example in which jobs are executed in any of the working modes such as the copy working mode or the image transmission working mode, and history information related to these jobs are stored in the history information storage area 236 in the manner illustrated in FIG. 3 or 4.

First, the controller 11 receives, from a user, an input of a history information calling instruction. Upon receiving an input of the history information calling instruction, the controller 11 calls up the display priority determination program 234 (Step S10).

The controller 11 that has called up the display priority determination program 234 determines whether or not the screen used to receive the input of the instruction, which is referred to as a call screen, is the home screen (Step S20).

If the call screen is the home screen, the controller 11 sets the display priority of all history information stored in the history information storage area 236 to "YES" (Yes in Step S20→Step S30).

Next, the controller 11 calls up the display processing program 233 to display the history information whose display priority is "YES". That is, the controller 11 displays all of the history information on the display 13, and then ends the processing (Step S40).

If the call screen used to receive the input of the history information calling instruction is not the home screen, the controller 11 determines whether or not the call screen is a simple screen (No in Step S20→Step S50).

If the call screen is a simple screen related to a specified working mode, the controller 11 sets the display priority of history information whose operation mode value corresponding to the specified working mode is "easy" to "YES" out of the history information stored in the history information storage area 236 (Yes in Step S50→Step S60).

Next, the controller 11 calls up the display processing program 233 to display the history information whose display priority is "YES". That is, the controller 11 displays only the history information related to the easy mode on the display 13, and then ends the processing (Step S70).

If the call screen is not a simple screen related to the specified working mode, the controller 11 sets the display priority of history information whose operation mode value corresponding to the specified working mode is "normal" to "YES" out of the history information stored in the history information storage area 236 (No in Step S50→Step S80).

Next, the controller 11 calls up the display processing program 233 to display the history information whose display priority is "YES". That is, the controller 11 displays only the history information related to the normal mode on the display 13, and then ends the processing (Step S90).

1.3. Operation Example

Figure 6A:
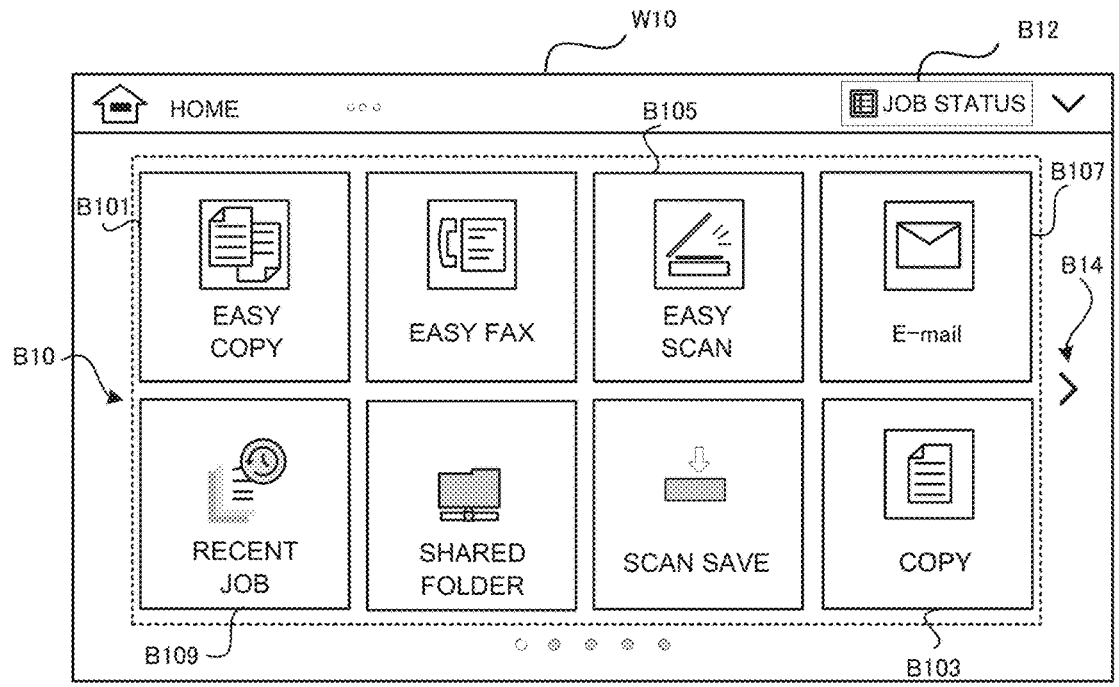
FIGS. 6A and 6B are diagrams for illustrating an operation example according to the first embodiment.

Next, an operation example according to the first embodiment will be described. The multifunction peripheral 10 according to the present disclosure has button areas allocated on a screen surface of the display 13 and detects the button areas being pressed via the operation inputter 15 of touch panel type disposed over the screen surface, allowing for the user's input of various operations. FIG. 6A shows a configuration example of a home screen W10. The home screen W10 is a basic screen that is displayed on the display 13, for example, upon power-on, standby, or recovery from a sleep state, and receives the user's input of operations.

The home screen W10 includes job selection buttons B10, a job status check button B12, and a display switching button B14.

The job selection buttons B10 each receive the user's selection of a desired job or one of various types of processing. For example, the user can display the simple screen for executing a copy job in the easy mode by pressing an "easy copy" button B101 included in the job selection buttons B10. For another example, the user can display the normal screen for executing a copy job in the normal mode by pressing a "copy" button B103. For another example, the user can display the simple screen for executing a scan job in the easy mode by pressing an "easy scan" button B105. For another example, the user can display the normal screen for executing an e-mail transmission job in the normal mode by pressing an "e-mail" button B107.

The job selection buttons B10 also include a "recent job" button B109 for receiving an input of a history information calling instruction. Upon the user pressing the "recent job" button B109, the controller 11 displays a history information display screen. Note that the processes from the pressing of the "recent job" button B109 to the display of the history information display screen correspond to the processes in Step S10 to Step S40 in FIG. 5.

FIG. 6A shows an example in which the following eight types of job/processing items are displayed as job/processing items selectable through the job selection buttons B10: "easy copy", "easy fax", "easy scan", "e-mail", "recent job", "shared folder", "scan save", and "copy". However, the user can display other job/processing items that can be implemented by the multifunction peripheral 10 by pressing the display switching button B14. The configuration of the job selection buttons B10 shown in FIG. 6A is merely an example. That is, the configuration of the job selection buttons B10 is not limited solely to what is shown in FIG. 6A.

The job status check button B12 receives an input of an instruction to display a job execution status check screen.

Figure 6B:
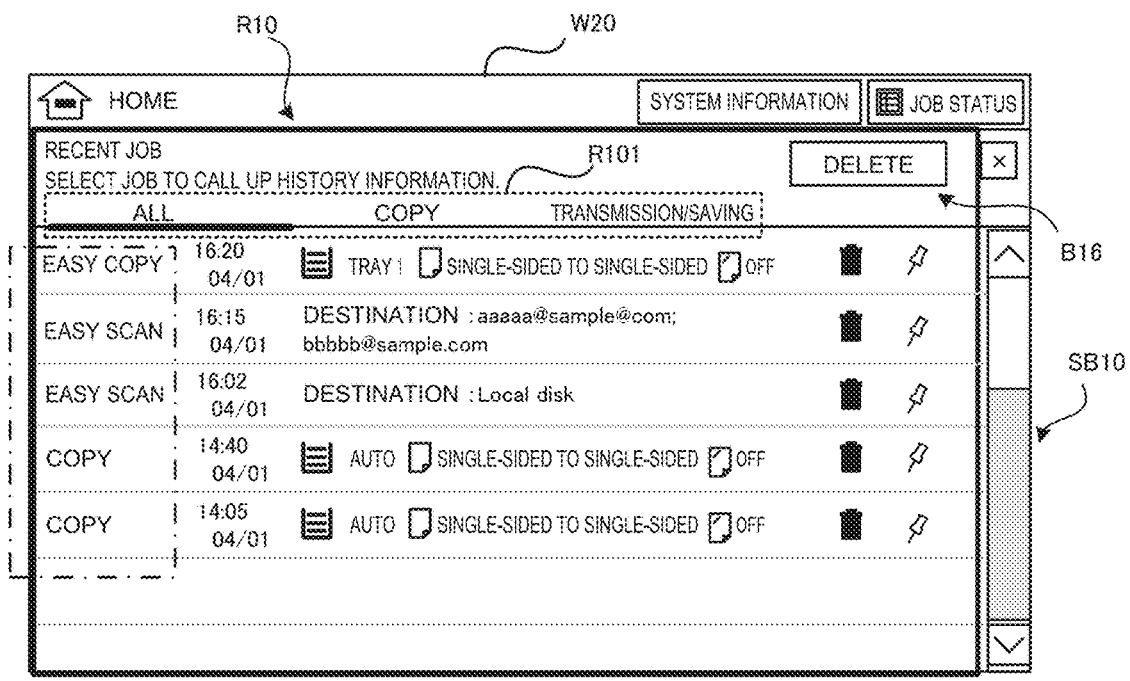

FIG. 6B shows a configuration example of a history information display screen W20 that is displayed by the controller 11 in response to the user pressing the "recent job" button B109.

The history information display screen W20 includes a history information display area R10 and a delete button B16. The history information display area R10 displays history information whose display priority has been set to "YES" by the controller 11. FIG. 6B shows an example in which the display priority of all history information stored in the history information storage area 236 has been set to "YES" because the screen used by the user to call up history information is the home screen.

In a case where the home screen W10 is used to call up the history information display screen W20, neither a working mode (job type) nor an operation mode can be specified. The controller 11 therefore displays history information related to all operation modes. In this case, the controller 11 displays all of the history information stored in the history information storage area 236 in descending order starting with the latest history information. FIG. 6B shows an example in which history information related to the following five jobs are displayed from top to bottom in chronological order: easy copy, easy scan, easy scan, copy, and copy. Note that the history information in this example corresponds to the history information having job ID "1" to job ID "5" shown as examples in FIGS. 3 and 4. FIG. 6B shows an example in which the number of items of history information that can be simultaneously displayed is set to five, but the setting of the number of items of history information that can be simultaneously displayed is changeable as appropriate according to the display capability of the display 13. A scroll bar SB10 may be provided as shown in FIG. 6B for when it is difficult to display all history information simultaneously, so that history information located toward the bottom of a list is sequentially displayed as the user scrolls down the list.

An operation mode, which is shown in an area enclosed by a dashed and dotted line in FIG. 6B, a job execution date and time, and some setting values are displayed in each display area in the history information display area R10. FIG. 6B shows an example in which the following three types of setting items are displayed with respect to history information of jobs executed in the copy working mode: paper selection, duplex copy, and staple/punch. Furthermore, in this example, a destination is displayed as a setting item with respect to history information of jobs executed in the image transmission working mode.

The history information display area R10 includes a working mode display area R101. In the working mode display area R101, a selection of working mode(s) on which the history information being currently displayed is based is visually displayed. For example, in FIG. 6B, the history information being currently displayed in the history information display area R10 covers all of the working modes (in the area enclosed by the dashed and dotted line in FIG. 6B). Accordingly, an underline of "all" in the working mode display area R101 is highlighted using a bold line to indicate that the history information being currently displayed covers all of the working modes. Other examples of highlighting methods are by displaying the text "all" using a different font, a different font size, or a different font color from other text displayed in a non-highlighted manner, or by displaying the text "all" using a different background color from other text displayed in a non-highlighted manner.

Note that each item of history information displayed in the history information display area R10 is selectable by the user. By selecting a desired item of history information, the user can direct the multifunction peripheral 10 to execute a job based on the selected item of history information or a similar job.

The delete button B16 receives an instruction to delete a certain item of history information from the history information display area R10. Upon the user pressing the delete button B16, the controller 11 stops displaying such an item of history information in the history information display area R10.

Figure 7A:
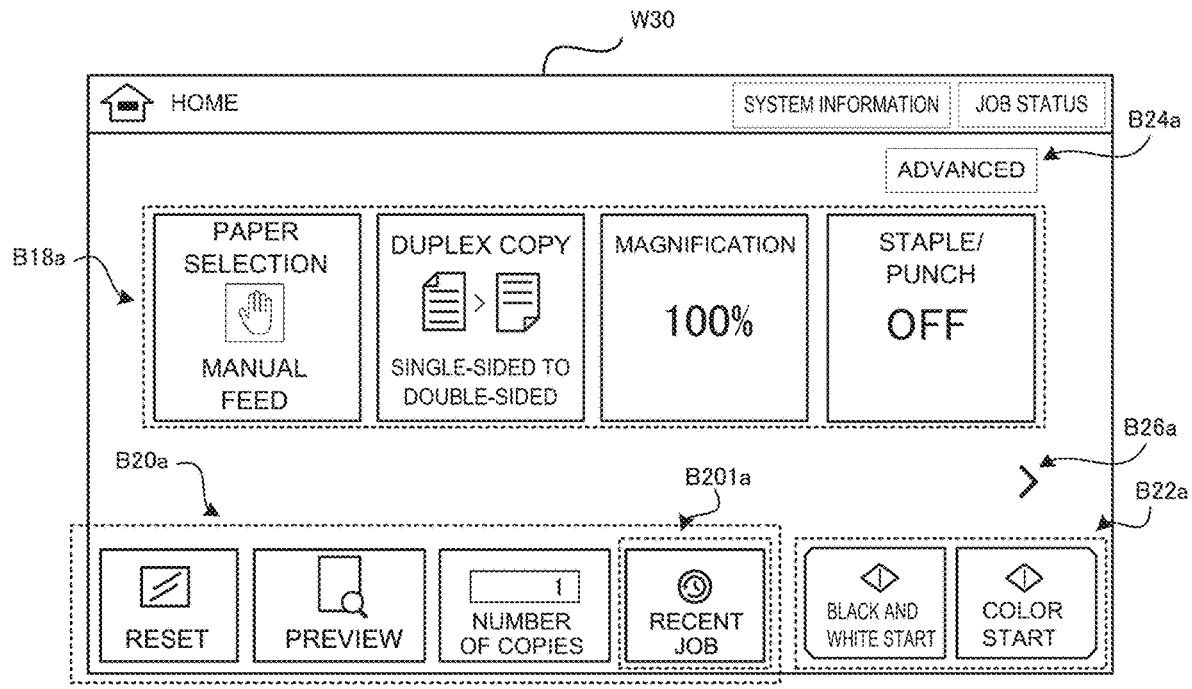
FIGS. 7A and 7B are diagrams for illustrating an operation example according to the first embodiment.

FIG. 7A shows a configuration example of a simple screen W30 displayed with respect to an easy (easy copy) operation mode under the copy working mode. The user can display the simple screen W30 by pressing the "easy copy" button B101 on the home screen W10.

Figure 8A:
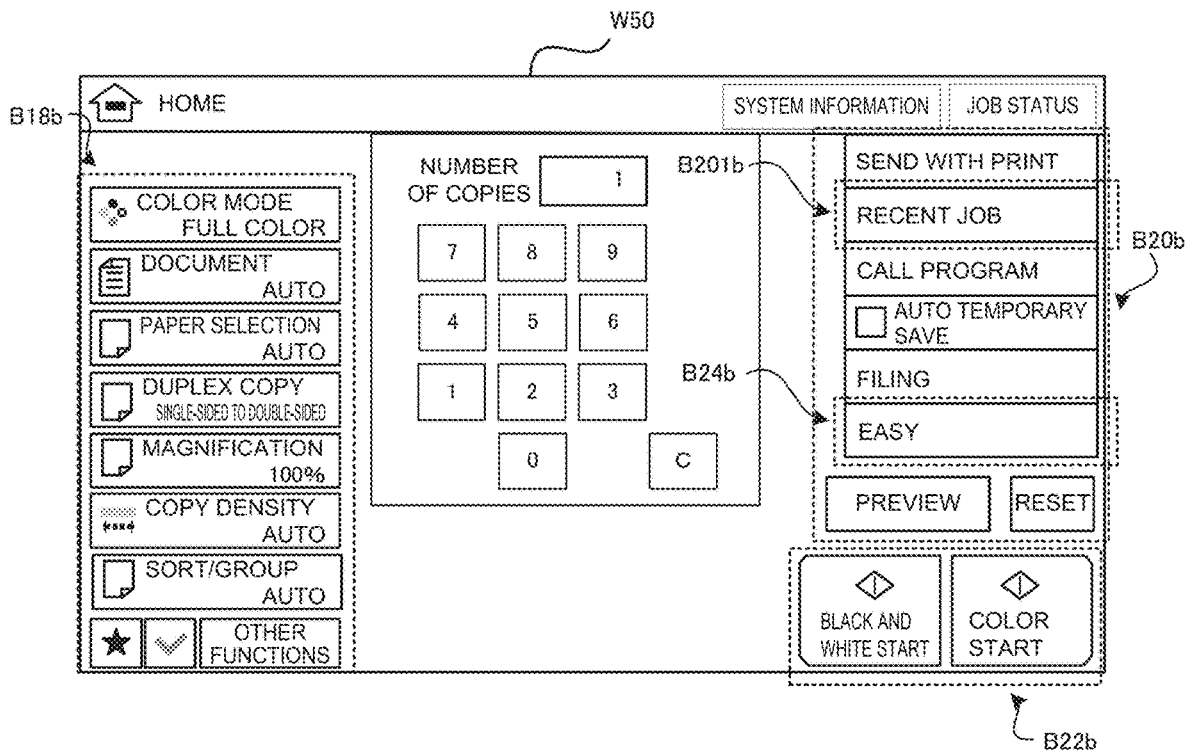
FIGS. 8A and 8B are diagrams for illustrating an operation example according to the first embodiment.

Compared to a normal screen illustrated in FIG. 8A, the simple screen W30 has a simple screen configuration with a limited number of setting items settable by the user. The simple screen W30 includes setting value buttons B18a, operation control buttons B20a, start buttons B22a, an advanced setting button B24a, and a display switching button B26a.

The setting value buttons B18a each receive a selection and an input of a setting value settable by the user through the simple screen W30. For example, the user can set a setting value related to paper selection by pressing a paper selection button, and then selecting a desired setting value from among the following paper selection-related items, not shown: "manual feed", "tray 1, 2, 3 . . . ", and "auto selection". FIG. 7A shows an example in which the following four setting items are displayed as settable setting items: "paper selection", "duplex copy", "magnification", and "staple/punch". Note that the user can display other setting items by pressing the display switching button B26a. Setting values that are shown on surfaces of the respective setting value buttons B18a are reflective of setting values in history information applied (FIG. 7A shows an example in which setting values in the history information having job ID "9" in FIG. 3 are applied). The configuration of the setting value buttons B18a shown in FIG. 7A is merely an example. That is, the configuration of the setting value buttons B18a is not limited solely to what is shown in FIG. 7A.

The operation control buttons B20a include, for example, a "reset" button, a "preview" button, a "number of copies" button, and a "recent job" button B201a. The "reset" button, for example, receives resetting of a setting value selected and inputted using any of the setting value buttons B18a and the "number of copies" button. The "preview" button receives a preview image display instruction prior to execution of a copy job. The "number of copies" button receives an input of the number of copies. The "recent job" button B201a receives an input of a history information calling instruction. Upon the user pressing the "recent job" button B201a, the controller 11 displays a history information display screen. Note that the processes from the pressing of the "recent job" button B201a to the display of the history information display screen correspond to the processes in Step S10, Step S20, and Step S50 to Step S70 in FIG. 5.

The start buttons B22a include a black and white start button and a color start button. When the user wishes to make a black-and-white copy, the user presses the black and white start button. When the user wishes to make a color copy, the user presses the color start button. Upon the user pressing the black and white start button or the color start button, processing related to the copy job is executed.

The advanced setting button B24a receives an instruction to switch the screen being displayed to the normal screen, which is described below.

Figure 7B:
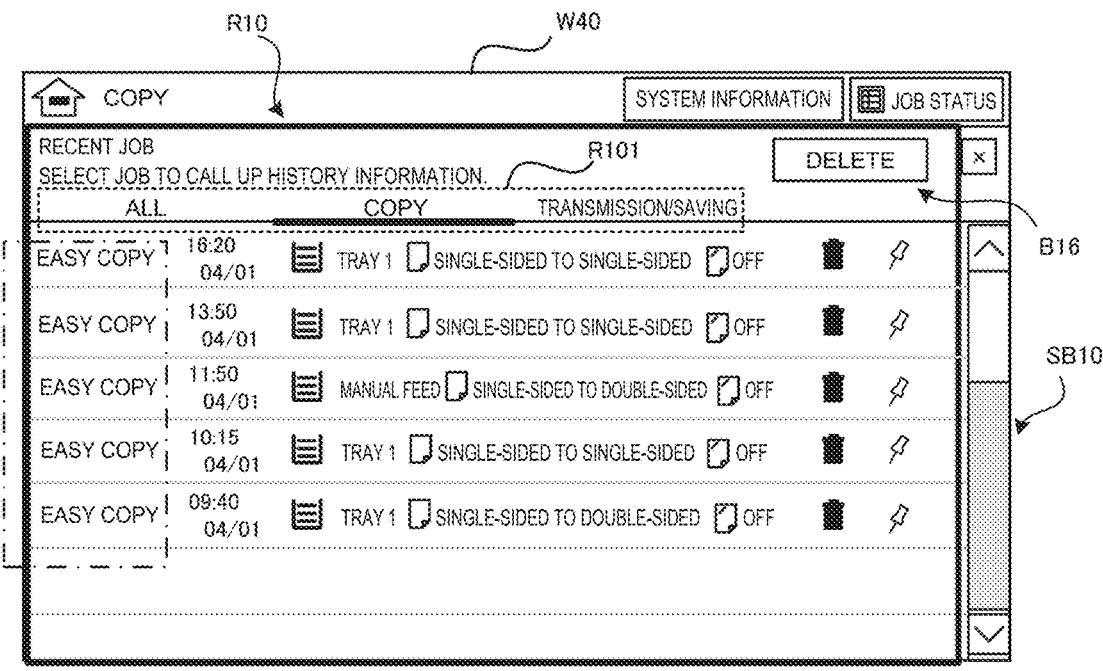

FIG. 7B shows a configuration example of a history information display screen W40 that is displayed by the controller 11 in response to the user pressing the "recent job" button B201a. Note that the history information display screen W40 has the same configuration as the history information display screen W20 described above, and therefore the same elements of configuration are labeled with the same reference signs.

FIG. 7B shows an example in which history information whose operation mode value is "easy" and whose display priority is "YES" is displayed out of the history information stored in the history information storage area 236.

In this case, the controller 11 displays only the history information whose operation mode value is "easy" in descending order (in an area enclosed by a dashed and dotted line in FIG. 7B) out of the history information stored in the history information storage area 236. FIG. 7B shows an example in which history information related to five easy copy jobs are displayed from top to bottom in chronological order. The history information shown in this example corresponds to the history information having job IDs "1", "6", "9", "12", and "14" shown as examples in FIG. 3.

Furthermore, in FIG. 7B, the history information being currently displayed in the history information display area R10 is copy working mode-related history information. Accordingly, an underline of "copy" in the working mode display area R101 is highlighted using a bold line, so that the user can recognize that the history information being currently displayed covers the copy working mode.

In a case where the history information displayed in the history information display area R10 includes a plurality of items of history information that have the same setting values or a plurality of items of history information that have the same displayed setting values but have different non-displayed setting values, it may be difficult to distinguish these items of history information from one another at a glance. For such a case, for example, the multifunction peripheral 10 may be provided with an enlarged display function of displaying non-displayed setting values by selecting a specific item of history information, or a contrast display function of displaying a plurality of items of history information to be compared in a contrasting manner. For the case of a plurality of items of history information having the same setting values, the multifunction peripheral 10 may be provided with a function of preferentially displaying only an item of history information related to the latest job and hiding the other items of history information, or a function of sorting the history information based on setting values.

FIG. 8A shows a configuration example of a normal screen W50 displayed with respect to a normal (normal copy) operation mode under the copy working mode. The user can display the normal screen W50 by pressing the "copy" button B103 on the home screen W10.

The normal screen W50 has a screen configuration that allows the user to make all settings related to execution of a copy job. The normal screen W50 has setting value buttons B18b, operation control buttons B20b, and start buttons B22b.

The setting value buttons B18b each receive a selection and an input of a setting value settable by the user among the setting values included in the history information. The user can set, for example, color mode-related setting values by pressing a color mode button and selecting a desired setting value from among the following color mode selection-related items, not shown: "full color", "black and white", "monochrome", and "auto (color/black and white)". FIG. 8A shows an example in which the following seven setting items are provided as settable setting items: "color mode", "document", "paper selection", "duplex copy", "magnification", "copy density", and "sort/group". Setting values that are shown on surfaces of the respective setting value buttons B18b are reflective of setting values in history information applied (FIG. 8A shows an example in which setting values in the history information having job ID "4" in FIG. 3 are applied). The configuration of the setting value buttons B18b shown in FIG. 8A is merely an example. That is, the configuration of the setting value buttons B18b is not limited solely to what is shown in FIG. 8A.

In addition to the aforementioned setting items, the setting value buttons B18b include an "other functions" button. The user can call up setting items other than the setting items being displayed, and select and input setting values by pressing the "other functions" button.

The operation control buttons B20b include, for example, extended function buttons, such as a "send with print"

button, a "call program" button, an "auto temporary save" button, and a "filing" button, as well as a "preview" button and a "reset" button. For example, the user can simultaneously print and send (for example, e-mail or fax), to a specified address, an image read during execution of a copy job by pressing the "send with print" button.

The operation control buttons B20b further include a "recent job" button B201b and an easy setting button B24b. The "recent job" button B201b receives an input of a history information calling instruction. Upon the user pressing the "recent job" button B201b, the controller 11 displays a history information display screen. Note that the processes from the pressing of the "recent job" button B201b to the display of the history information display screen correspond to the processes in Step S10, Step S20, Step S50, Step S80, and Step S90 in FIG. 5.

The easy setting button B24b receives an instruction to switch the screen being displayed to the simple screen W30.

The start buttons B22b include a black and white start button and a color start button. When the user wishes to make a black-and-white copy, the user presses the black and white start button. When the user wishes to make a color copy, the user presses the color start button. Upon the user pressing the black and white start button or the color start button, processing related to the copy job is executed.

Figure 8B:
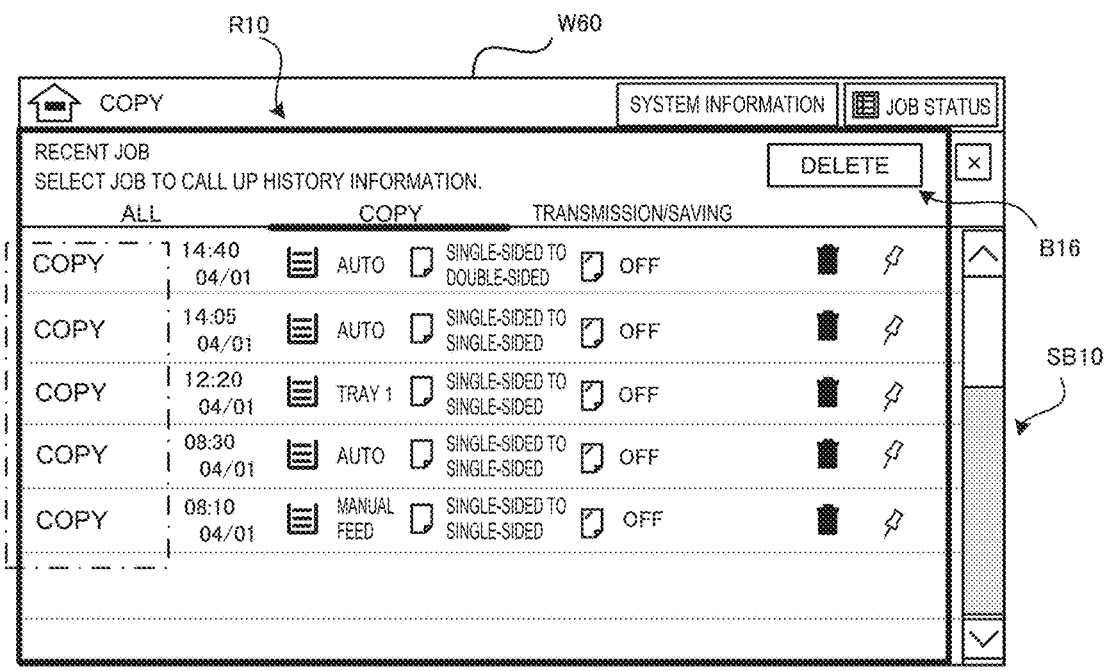

FIG. 8B shows a configuration example of a history information display screen W60 that is displayed by the controller 11 in response to the user pressing the "recent job" button B201b. Note that the history information display screen W60 has the same configuration as the history information display screen W20 described above, and therefore the same elements of configuration are labeled with the same reference signs.

FIG. 8B shows an example in which history information whose operation mode value is "normal" and whose display priority is "YES" is displayed out of the history information stored in the history information storage area 236.

In this case, the controller 11 displays only the history information whose operation mode value is "normal" in descending order (in an area enclosed by a dashed and dotted line in FIG. 8B) out of the history information stored in the history information storage area 236. FIG. 8B shows an example in which history information related to five copy jobs are displayed from top to bottom in chronological order. The history information shown in this example corresponds to the history information having job IDs "4", "5", "7", "17", and "20" shown as examples in FIG. 3.

Furthermore, in FIG. 8B, the history information being currently displayed in the history information display area R10 is copy working mode-related history information (in the area enclosed by the dashed and dotted line in FIG. 8B). Accordingly, an underline of "copy" in the working mode display area R101 is highlighted using a bold line, so that the user can recognize that the history information being currently displayed covers the copy working mode.

Figure 9A:
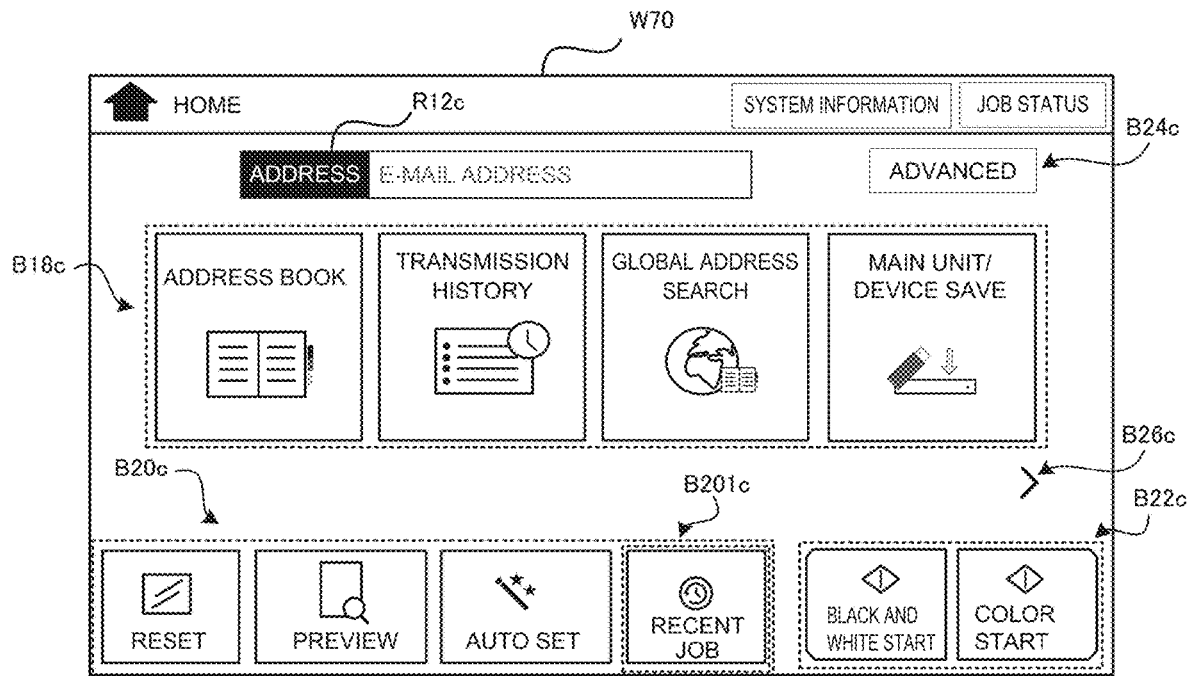
FIGS. 9A and 9B are diagrams for illustrating an operation example according to the first embodiment.

FIG. 9A shows a configuration example of a simple screen W70 displayed with respect to an easy (easy scan) operation mode under the image transmission working mode. The user can display the simple screen W70 by pressing the "easy scan" button B105 on the home screen W10.

Figure 10A:
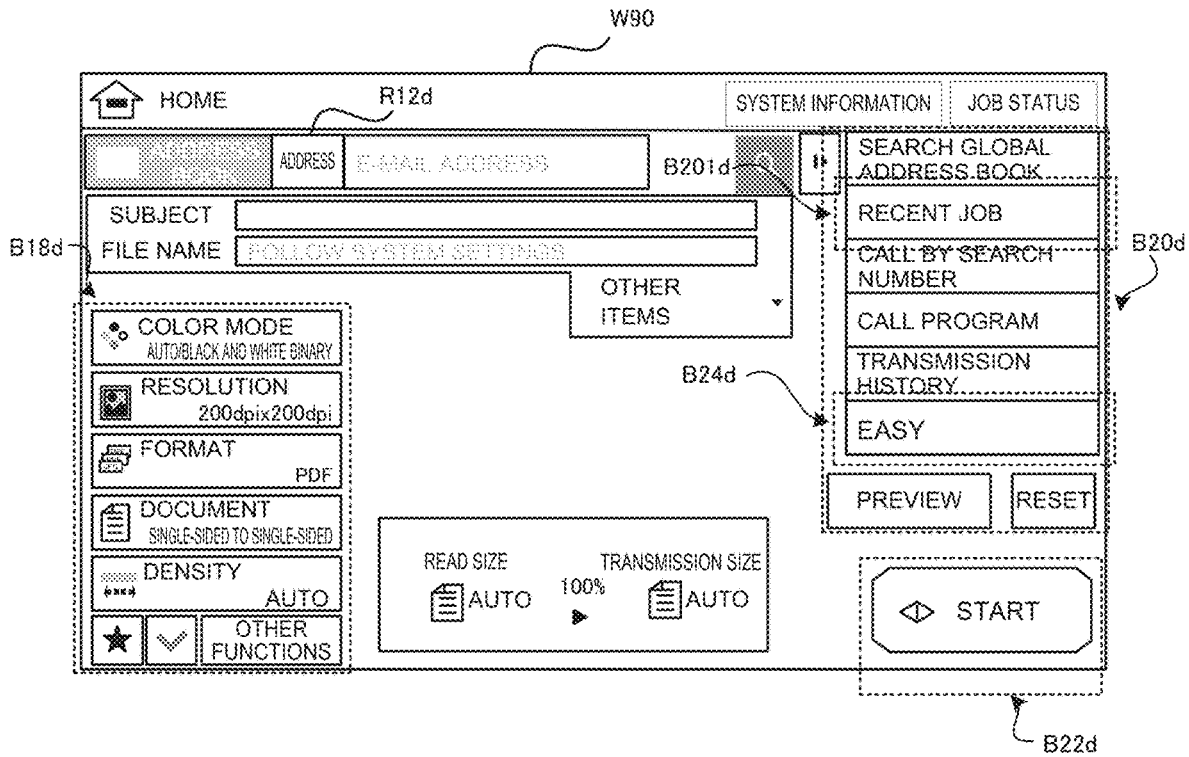
FIGS. 10A and 10B are diagrams for illustrating an operation example according to the first embodiment.

Compared to a normal screen illustrated in FIG. 10A, the simple screen W70 has a simple screen configuration with a limited number of setting items settable by the user. The simple screen W70 includes setting value buttons B18c, operation control buttons B20c, start buttons B22c, an advanced setting button B24c, a display switching button B26c, and an address display area R12c.

The setting value buttons B18c each receive a selection and an input of a setting value settable by the user through the simple screen W70. The user can press, for example, an address book button and use the thus displayed address book, not shown, to set, as a setting value, an address of a destination of image data generated through scanning. FIG. 9A shows an example in which the following four types of setting items are displayed as settable setting items: "address book", "transmission history", "search global address", and "main unit/device save". Note that the user can display other setting items by pressing the display switching button B26c.

The operation control buttons B20c include, for example, a "reset" button, a "preview" button, an "auto set" button, and a "recent job" button B201c. The "reset" button, for example, receives resetting of a setting value selected and inputted using any of the setting value buttons B18c and other buttons. The preview button receives a preview image display instruction prior to execution of an image transmission job. The auto set button receives application of device settings configured in system setting. The "recent job" button B201c receives an input of a history information calling instruction. Upon the user pressing the "recent job" button B201c, the controller 11 displays a history information display screen. Note that the processes from the pressing of the "recent job" button B201c to the display of the history information display screen correspond to the processes in Step S10, Step S20, and Step S50 to Step S70 in FIG. 5.

The start buttons B22c include a black and white start button and a color start button. When the user wishes to send a black-and-white image, the user presses the black and white start button. When the user wishes to send a color image, the user presses the color start button. Upon the user pressing the black and white start button or the color start button, the controller 11 executes processing related to the image transmission job.

The advanced setting button B24c receives an instruction to switch the screen being displayed to a normal screen W90 illustrated in FIG. 10A.

In the address display area R12c, the address of the destination of the image data is displayed, which is selected and inputted through one of the following setting value buttons B18c: the address book button, the transmission history button, the search global address button, and the main unit/device save button.

Figure 9B:
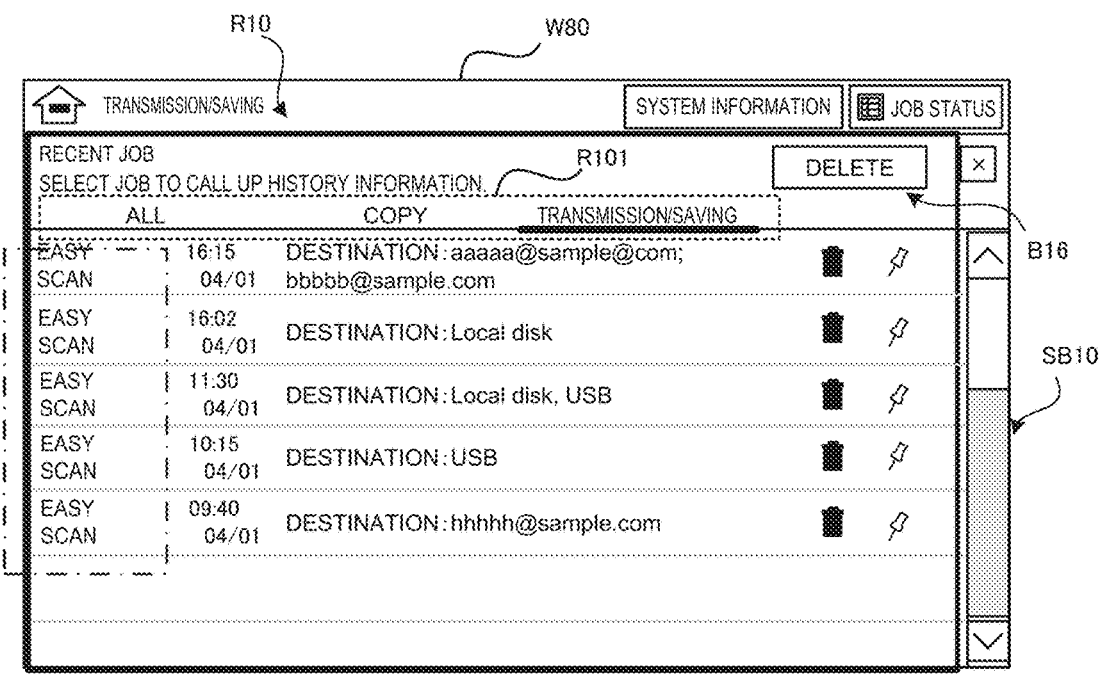

FIG. 9B shows a configuration example of a history information display screen W80 that is displayed by the controller 11 in response to the user pressing the "recent job" button B201c. Note that the history information display screen W80 has the same configuration as the history information display screen W20 described above, and therefore the same elements of configuration are labeled with the same reference signs.

FIG. 9B shows an example in which history information whose operation mode value is "easy" and whose display priority is "YES" is displayed out of the history information stored in the history information storage area 236.

In this case, the controller 11 displays only the history information whose operation mode value is "easy" in descending order (in an area enclosed by a dashed and dotted line in FIG. 9B) out of the history information stored in the history information storage area 236. FIG. 9B shows an example in which history information related to five easy scan jobs are displayed from top to bottom in chronological order. The history information shown in this example corresponds to the history information having job IDs "2", "3", "10", "15", and "18" shown as examples in FIG. 4.

Furthermore, in FIG. 9B, the history information being currently displayed in the history information display area R10 is image transmission (saving) working mode-related history information. Accordingly, an underline of "transmission/saving" in the working mode display area R101 is highlighted using a bold line, so that the user can recognize that the history information being currently displayed covers the image transmission working mode.

FIG. 10A shows a configuration example of the normal screen W90 displayed with respect to a normal (e-mail) operation mode under the image transmission working mode. The user can display the normal screen W90 by pressing the "e-mail" button B107 on the home screen W10.

The normal screen W90 has a screen configuration that allows the user to make all settings related to execution of an e-mail transmission job. The normal screen W90 has setting value buttons B18d, operation control buttons B20d, a start button B22d, and an address display area R12d.

The setting value buttons B18d each receive a selection and an input of a setting value settable by the user. The user can set, for example, color mode-related setting values by pressing a color mode button and selecting a desired setting value from among the following color mode selection-related items, not shown: "full color", "black and white", "monochrome", and "auto (color/black and white)". FIG. 10A shows an example in which the following five setting items are provided as settable setting items: "color mode", "resolution", "format", "document", and "density". Setting values that are shown on surfaces of the respective setting value buttons B18d are reflective of setting values in history information selected (FIG. 10A shows an example in which setting values in the history information having job ID "8" in FIG. 4 are applied). The configuration of the setting value buttons B18d shown in FIG. 10A is merely an example. That is, the configuration of the setting value buttons B18d is not limited solely to what is shown in FIG. 10A.

In addition to the aforementioned setting items, the setting value buttons B18d include an "other functions" button. The user can call up setting items other than the setting items being displayed, and select and input setting values by pressing the "other functions" button.

The operation control buttons B20d include extended function buttons, such as a "search global address book" button, a "call by search number" button, and a "call program" button, as well as a "preview" button and a "reset" button. For example, the user can select, from a global address book, an address of a destination of image data by pressing the "search global address book" button.

The operation control buttons B20d further include a "recent job" button B201d and an easy setting button B24d. The "recent job" button B201d receives an input of a history information calling instruction. Upon the user pressing the "recent job" button B201d, the controller 11 displays a history information display screen. Note that the processes from the pressing of the "recent job" button B201d to the display of the history information display screen correspond to the processes in Step S10, Step S20, Step S50, Step S80, and Step S90 in FIG. 5.

The start button B22d receives an input of an instruction to execute an image transmission job. Upon the start button B22d being pressed, the controller 11 executes processing related to the image transmission job.

In the address display area R12d, the address of the destination of the image data is displayed, which is selected and inputted from the address book or a transmission history, or entered directly.

Figure 10B:
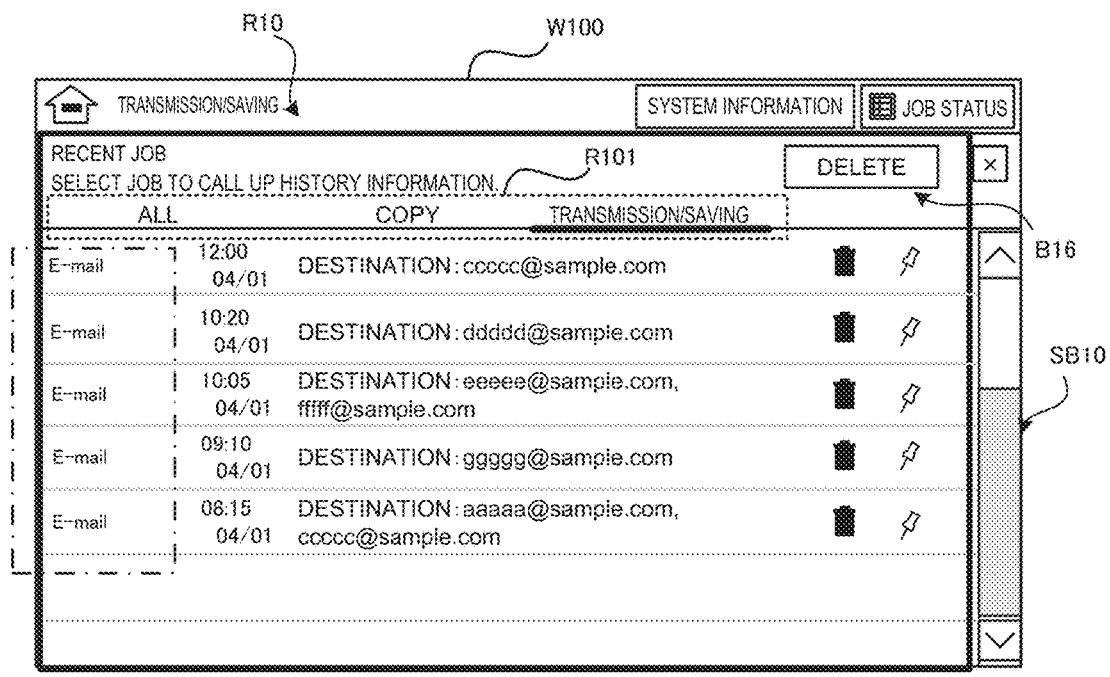

FIG. 10B shows a configuration example of a history information display screen W100 that is displayed by the controller 11 in response to the user pressing the "recent job" button B201d. Note that the history information display screen W100 has the same configuration as the history information display screen W20 described above, and therefore the same elements of configuration are labeled with the same reference signs.

FIG. 10B shows an example in which history information whose operation mode value is "normal" and whose display priority is "YES" is displayed out of the history information stored in the history information storage area 236.

In this case, the controller 11 displays only the history information whose operation mode value is "normal" in descending order (in an area enclosed by a dashed and dotted line in FIG. 10B) out of the history information stored in the history information storage area 236. FIG. 10B shows an example in which history information related to five e-mail jobs are displayed from top to bottom in chronological order. The history information shown in this example corresponds to the history information having job IDs "8", "11", "13", "16", and "19" shown as examples in FIG. 4.

Furthermore, in FIG. 10B, the history information being currently displayed in the history information display area R10 is image transmission (saving) working mode-related history information. Accordingly, an underline of "transmission/saving" in the working mode display area R101 is highlighted using a bold line, so that the user can recognize that the history information being currently displayed covers the image transmission working mode.

As described above, in history information calling according to the first embodiment, the display priority of history information is set based on a specified operation mode so that relevant history information is displayed. Thus, it is possible to provide an image processing apparatus and the like that allows for an improvement in the convenience of history information retrieval and selection.

2. Second Embodiment

According to a second embodiment, history information to be displayed on the history information display screen through narrowing is changeable.

2.1. Functional Configuration

Figure 11:
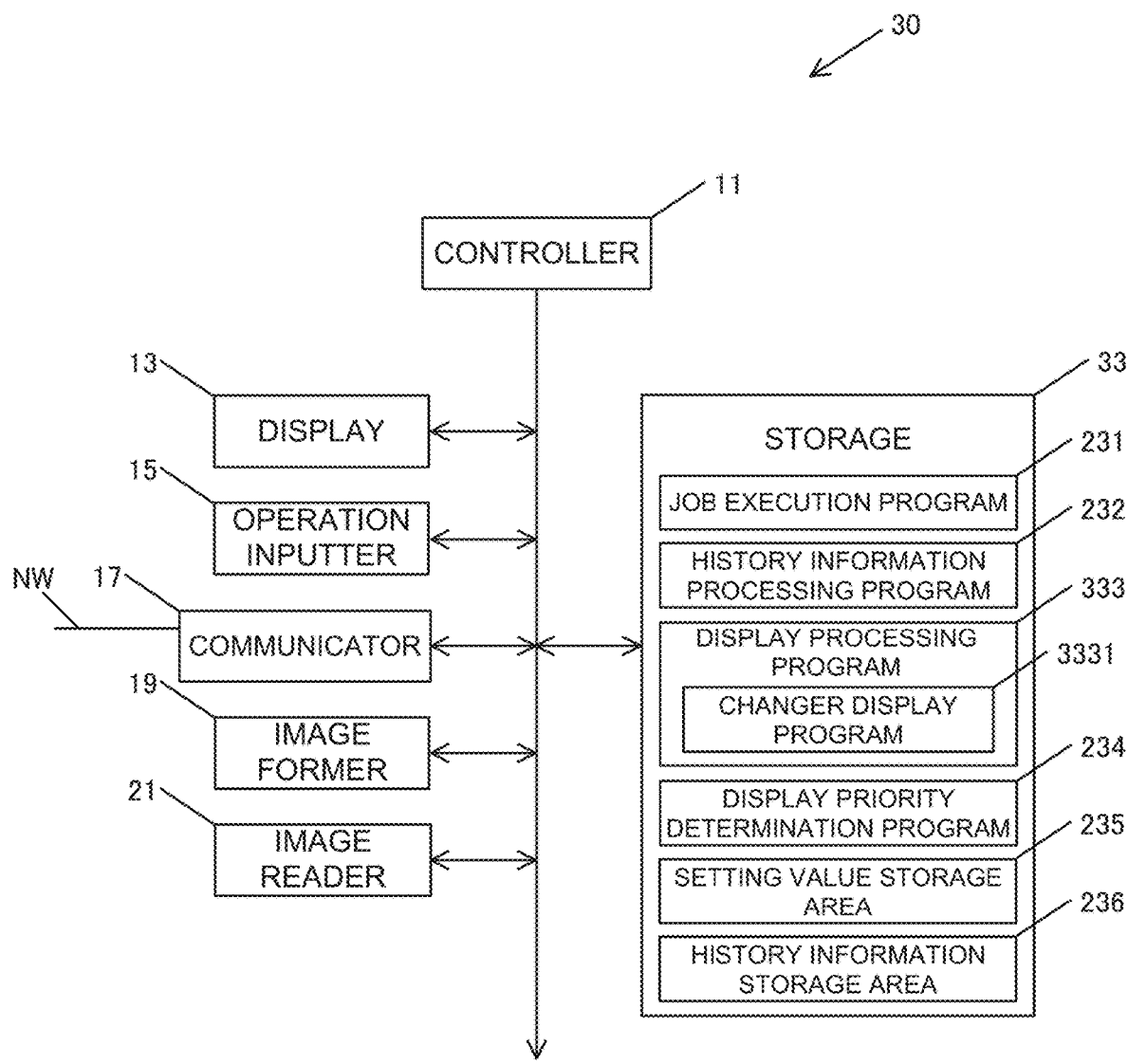
FIG. 11 is a diagram for illustrating a functional configuration of a multifunction peripheral according to a second embodiment.

FIG. 11 is a diagram for illustrating a functional configuration of a multifunction peripheral 30 according to the second embodiment. The multifunction peripheral 30 includes a storage 33 in place of the storage 23 of the multifunction peripheral 10 according to the first embodiment. Other than the storage 33, the multifunction peripheral 30 may have the same configuration as the multifunction peripheral 10 according to the first embodiment. The same elements of configuration are therefore labeled with the same reference signs, and description thereof will be omitted.

The storage 33 stores therein the job execution program 231, the history information processing program 232, a display processing program 333, and the display priority determination program 234. In the storage 33, the setting value storage area 235 and the history information storage area 236 are reserved.

The display processing program 333 has the configuration of the display processing program 233 according to the first embodiment and further includes a changer display program 3331. The controller 11 that has called up the changer display program 3331 displays, on a history information display screen, a narrow down button as a changer. The narrow down button receives a selection of history information to be displayed through narrowing by operation mode.

Upon receiving a selection of history information through the narrow down button, the controller 11 sets the display priority of the selected history information to "YES" and changes the display priority of history information being currently displayed to "NO".

2.2. Flow of Processing

Figure 12:
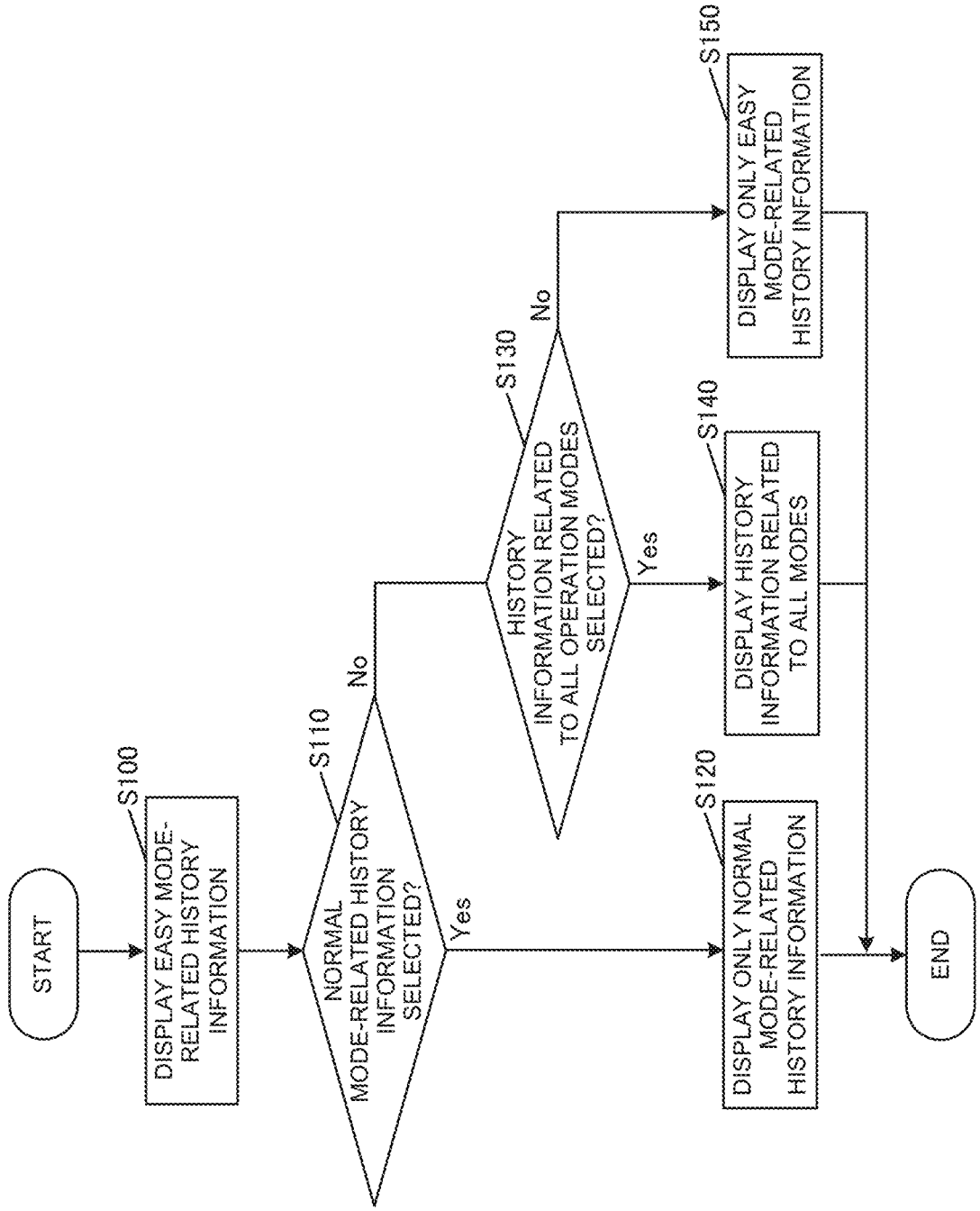
FIG. 12 is a flowchart for illustrating a flow of processing according to the second embodiment.

Next, a flow of processing according to the second embodiment will be described using a flowchart shown in FIG. 12. The description given below with reference to FIG. 12 is based on the assumption that the processing starts with the history information display screen displaying easy mode-related history information. However, the processing may start with the history information display screen displaying normal mode-related history information.

The controller 11 determines whether or not normal mode-related history information has been selected through the narrow down button with the history information display screen displaying easy mode-related history information (Step S100→Step S110).

Upon determining that normal mode-related history information has been selected, the controller 11 sets the display priority of the selected normal mode-related history information to "YES" and changes the display priority of the easy mode-related history information being displayed in Step S100 to "NO". Subsequently, the controller 11 displays only the normal mode-related history information whose display priority is "YES", and then ends the processing (Yes in Step S110→Step S120).

Upon determining that normal mode-related history information has not been selected, the controller 11 determines whether or not history information related to all operation modes has been selected (No in Step S110→Step S130).

Upon determining that history information related to all operation modes has been selected, the controller 11 changes the display priority of normal mode-related history information to "YES". Subsequently, the controller 11 displays the easy mode-related history information and the normal mode-related history information whose display priority is "YES", and then ends the processing (Yes in Step S130→Step S140).

Upon determining that history information related to all operation modes has not been selected, the controller 11 does not change the display priority of the history information and continues to display only the easy mode-related history information (No in Step S130→Step S150).

2.3. Operation Example

Figure 13A:
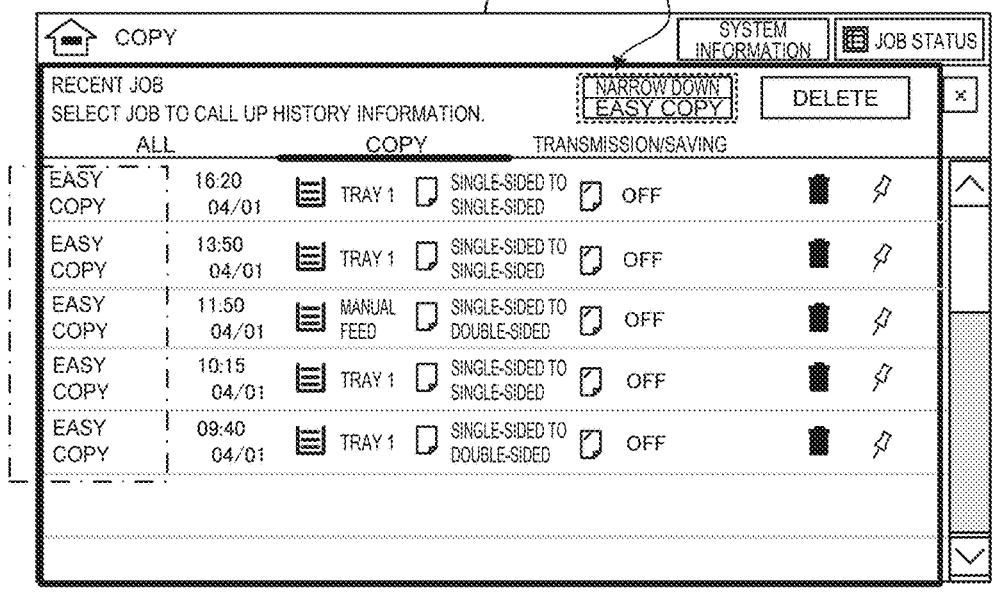
FIGS. 13A to 13C are diagrams for illustrating an operation example according to the second embodiment.
Figure 13B:
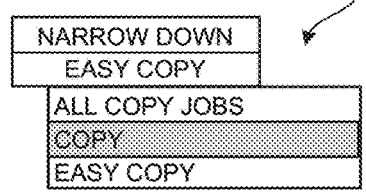
Figure 13C:
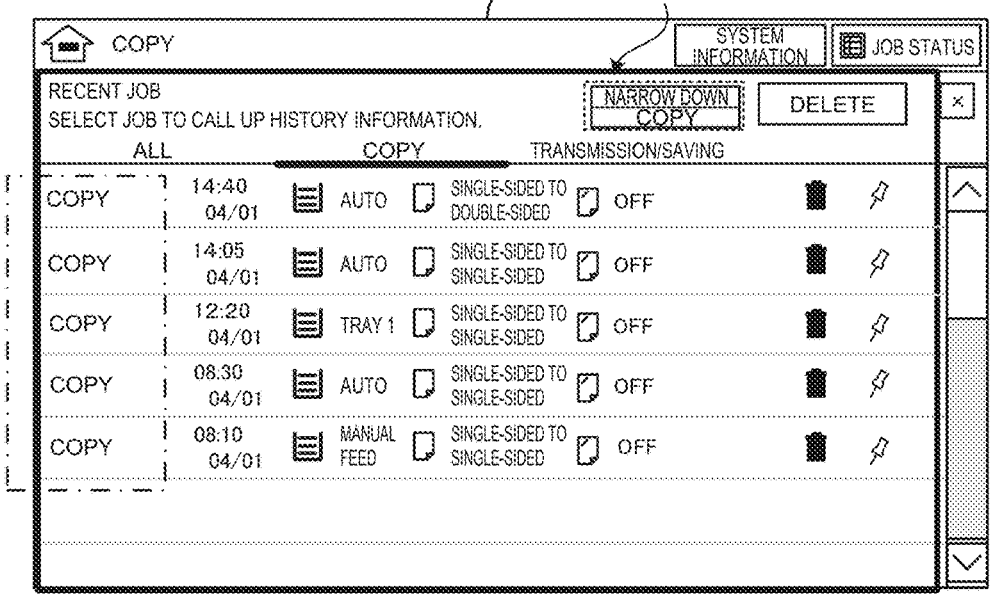

Next, an operation example according to the second embodiment will be described. FIGS. 13A to 13C show an operation example in which the screen being displayed is changed from a history information display screen W41, which displays easy copy history information, to a history information display screen W61, which displays copy history information.

As shown in FIG. 13A, the history information display screen W41, which displays easy copy history information, has a narrow down button B281 that receives a selection of history information to be displayed through narrowing by operation mode.

Upon the user pressing the narrow down button B281, a pull-down menu expands downward on the screen as illustrated in FIG. 13B. In this operation example, any of "all copy jobs" history information, "copy" history information, and "easy copy" history information is selectable, and FIG. 13B shows the pull-down menu on which "copy" history information is being selected therefrom.

FIG. 13C shows an example in which the history information display screen W61 is displayed, which is displayed upon the user pressing the narrow down button B281 and selecting "copy" history information. As shown in an area enclosed by a dashed and dotted line in FIG. 13C, the history information to be displayed through narrowing has been changed from easy copy history information to copy history information.

Figure 14A:
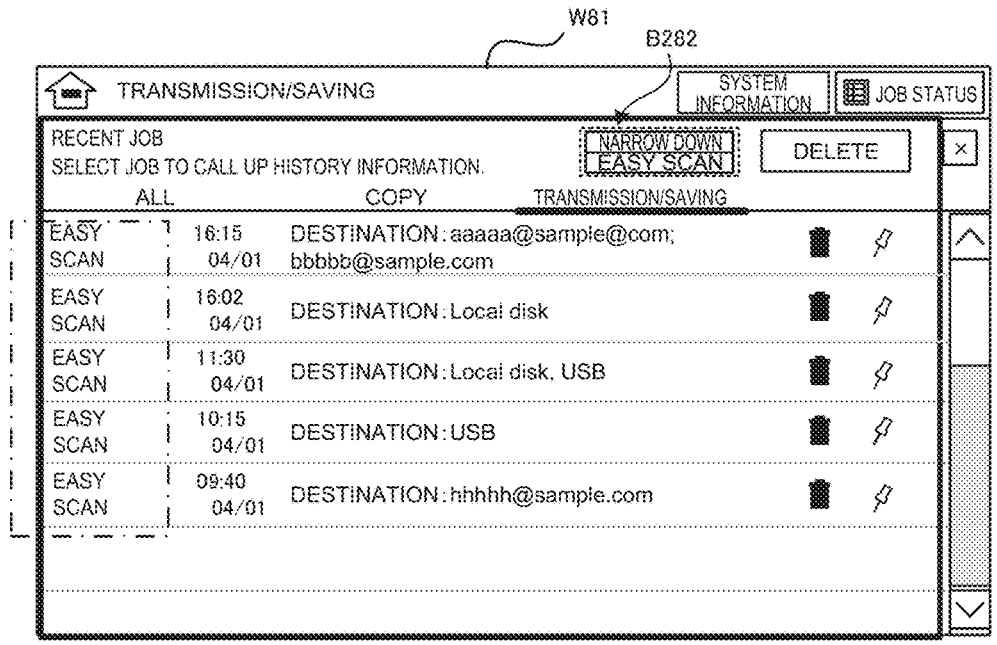
FIGS. 14A to 14C are diagrams for illustrating an operation example according to the second embodiment.
Figure 14B:
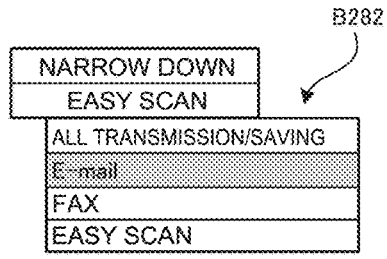
Figure 14C:
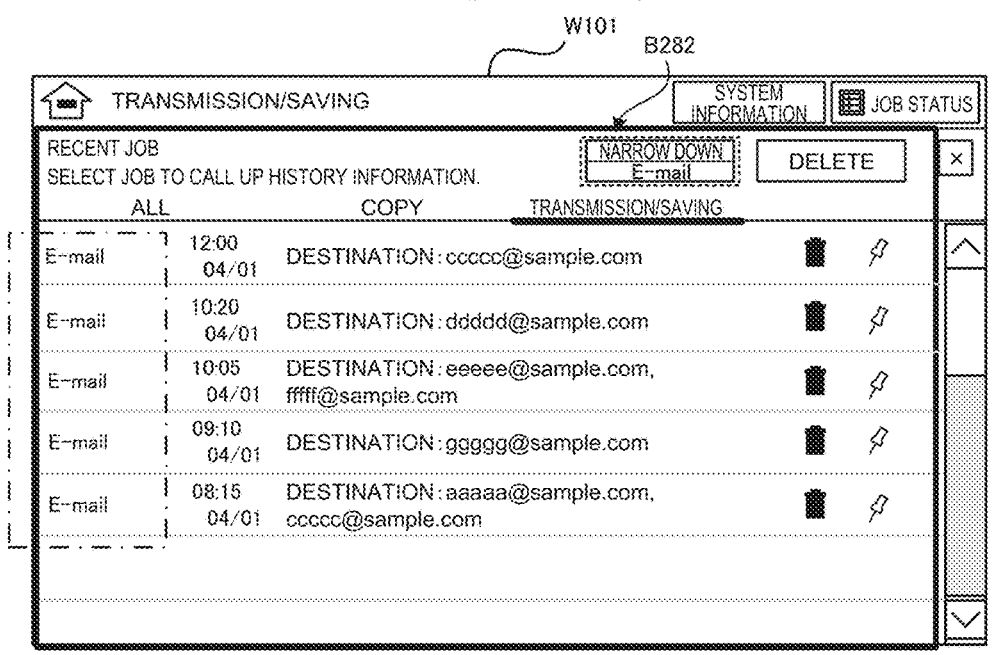

FIGS. 14A to 14C are diagrams for illustrating an operation example in which the history information to be displayed through narrowing is changed, so that the screen being displayed is changed from a history information display screen W81, which displays easy scan history information, to a history information display screen W101, which displays e-mail history information.

As shown in FIG. 14A, the history information display screen W81, which displays easy scan history information, has a narrow down button B282 that receives a selection of history information to be displayed through narrowing by operation mode.

Upon the user pressing the narrow down button B282, a pull-down menu expands downward on the screen as illustrated in FIG. 14B. In this operation example, any of "all transmission/saving" history information, "e-mail" history information, "fax" history information, and "easy scan" history information is selectable, and FIG. 14B shows the pull-down menu on which "e-mail" history information is being selected therefrom.

FIG. 14C shows an example in which the history information display screen W101 is displayed, which is displayed upon the user pressing the narrow down button B282 and selecting "e-mail" history information. As shown in an area enclosed by a dashed and dotted line in FIG. 14C, the history information to be displayed through narrowing has been changed from easy scan history information to e-mail history information.

FIG. 15A shows an example in which a history information display screen W110 is displayed, which is displayed as a result of a transition from the screen shown in FIG. 13A upon the user pressing the narrow down button B281 and selecting "all copy jobs" history information. As shown in an area enclosed by a dashed and dotted line in FIG. 15A, the history information to be displayed through narrowing has been changed from easy copy history information to all copy jobs history information.

Likewise, FIG. 15B shows an example in which a history information display screen W120 is displayed, which is displayed as a result of a transition from the screen shown in FIG. 14A upon the user pressing the narrow down button B282 and selecting "all transmission/saving" history information. As shown in an area enclosed by a dashed and dotted line in FIG. 15B, the history information to be displayed through narrowing has been changed from easy scan history information to all transmission/saving history information.

The narrow down buttons B281 and B282 described with reference to FIGS. 13A to 15B allow for narrowing by operation mode related to a single working mode such as the copy working mode or the image transmission working mode. However, a different narrow down button may be adopted that allows for, for example, narrowing by operation mode related to a plurality of working modes such as a broadcast transmission working mode.

Figure 16A:
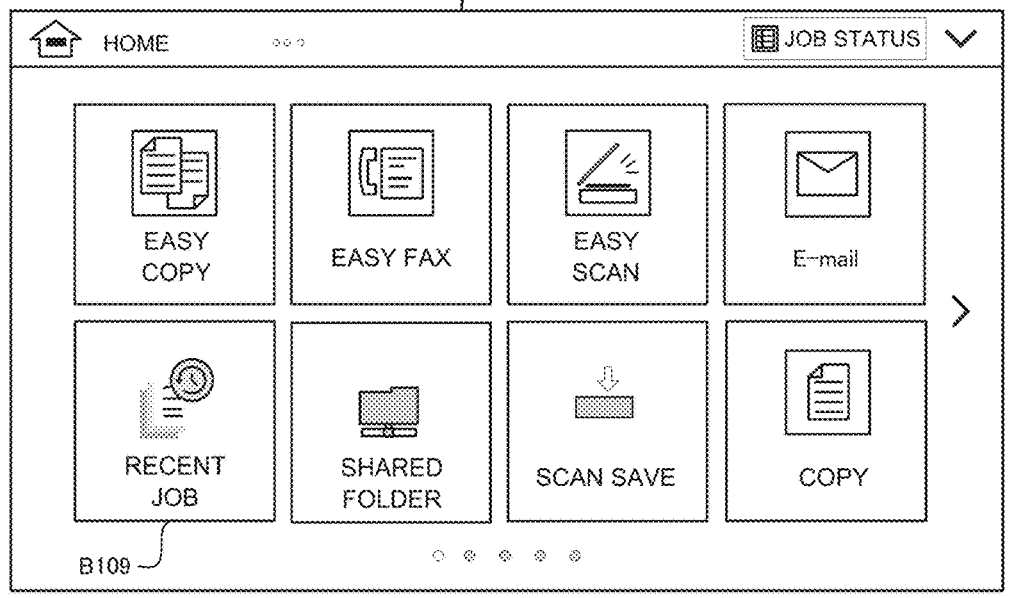
FIGS. 16A to 16C are diagrams for illustrating an operation example according to the second embodiment.
Figure 16B:
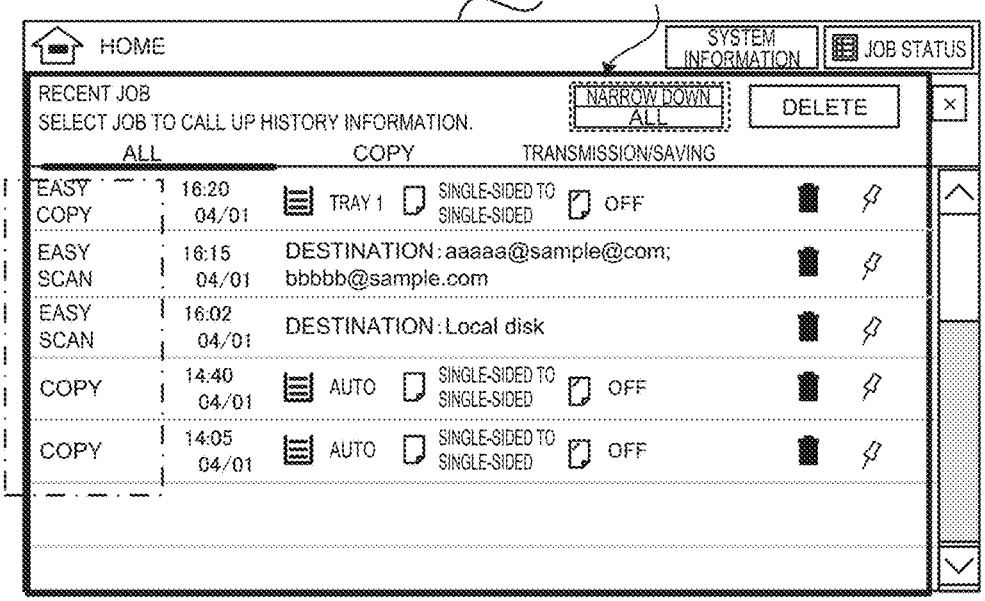
Figure 16C:
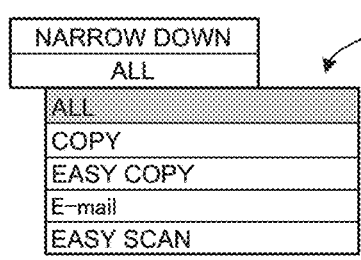

FIGS. 16A to 16C are diagrams for illustrating an operation example in which the history information to be displayed on a history information display screen W21, which is called up from the home screen W10, through narrowing is changed.

The user displays the history information display screen W21 shown in FIG. 16B by pressing the "recent job" button B109 on the home screen W10 shown in FIG. 16A. Note that in a case where the home screen W10 is used to call up the history information display screen W21, neither a working mode (job type) nor an operation mode can be specified. The controller 11 therefore displays history information related to all operation modes.

The history information display screen W21 called up from the home screen W10 is also provided with a narrow down button B283 illustrated in FIG. 16B, making it possible to change the screen being displayed from the history information display screen W21 to a history information display screen that displays specific history information.

In this example, as illustrated in FIG. 16C, "all", "copy", "easy copy", "e-mail", and "easy scan" operation modes are displayed in a selectable manner through the narrow down button B283 to allow specific history information to be displayed. Note that two or more of these operation modes may be selected in combination, such as a combination of "easy copy" and "easy scan", for example.

As described above, according to the second embodiment, the history information to be displayed on the history information display screen through narrowing is changeable. Thus, it is possible to provide an image processing apparatus and the like that allows for an improvement in the convenience of history information retrieval and selection.

3. Third Embodiment

According to a third embodiment, history information related to a different operation mode from a specified operation mode is displayed as a complement if the number of items of history information that can be otherwise displayed on a history information display screen is less than a predetermined number.

3.1 Functional Configuration

A multifunction peripheral according to the third embodiment may have the same functional configuration as the multifunction peripheral 30 according to the second embodiment. Description of the functional configuration of the third embodiment will therefore be omitted herein.

3.2 Flow of Processing

A flow of processing according to the third embodiment will be described using a flowchart shown in FIG. 17. The description given below with reference to FIG. 17 is based on the assumption that the processing starts with an input of an instruction to display easy mode-related history information. However, the processing may start with an input of an instruction to display normal mode-related history information.

Upon the user inputting an instruction to display easy mode-related history information, the controller 11 determines whether or not the number of items of easy mode-related history information is greater than or equal to a displayable number (Step S160→Step S170). The displayable number as used herein means the number of items of history information that can be displayed on the history information display screen. This number of items of history information that can be displayed on the history information display screen may be the number of items of history information that can be simultaneously displayed on the history information display screen or the number of items of history information that can be sequentially displayed on the history information display screen. For example, in a case where the number of items of history information that can be simultaneously displayed is five as in the case of the history information display screen W20 illustrated in FIG. 6B, for example, the displayable number may be set to five. For another example, in a case where five additional items of history information located toward the bottom of a list can be displayed by scrolling down the list using the scroll bar SB10, the displayable number may be set to ten in total, which is a sum of the simultaneously displayable five items and the additional five items. Alternatively, the displayable number may be set based on the number of items of history information stored in the history information storage area 236. The specific numbers mentioned as the displayable number herein are merely examples, and the displayable number is not limited to these examples.

If the number of items of easy mode-related history information is greater than or equal to the displayable number, the controller 11 displays the easy mode-related history information on the history information display screen, and then ends the processing (Yes in Step S170→Step S180).

If the number of items of easy mode-related history information is less than the displayable number, the controller 11 determines whether or not there is any normal mode-related history information that can be displayed (No in Step S170→Step S190).

If there is normal mode-related history information that can be displayed, the controller 11 sets the display priority of the normal mode-related history information to "YES". Subsequently, the controller 11 displays the normal mode-related history information after displaying the easy mode-related history information, and then ends the processing (Yes in Step S190→Step S200).

If there is not normal mode-related history information that can be displayed, such as if no normal mode-related history information is stored in the history information storage area 236 or if normal mode-related history information stored in the history information storage area 236 has a display restriction, the controller 11 displays only the easy mode-related history information, and then ends the processing (No in Step S190→Step S180).

3.3 Operation Example

Figure 18A:
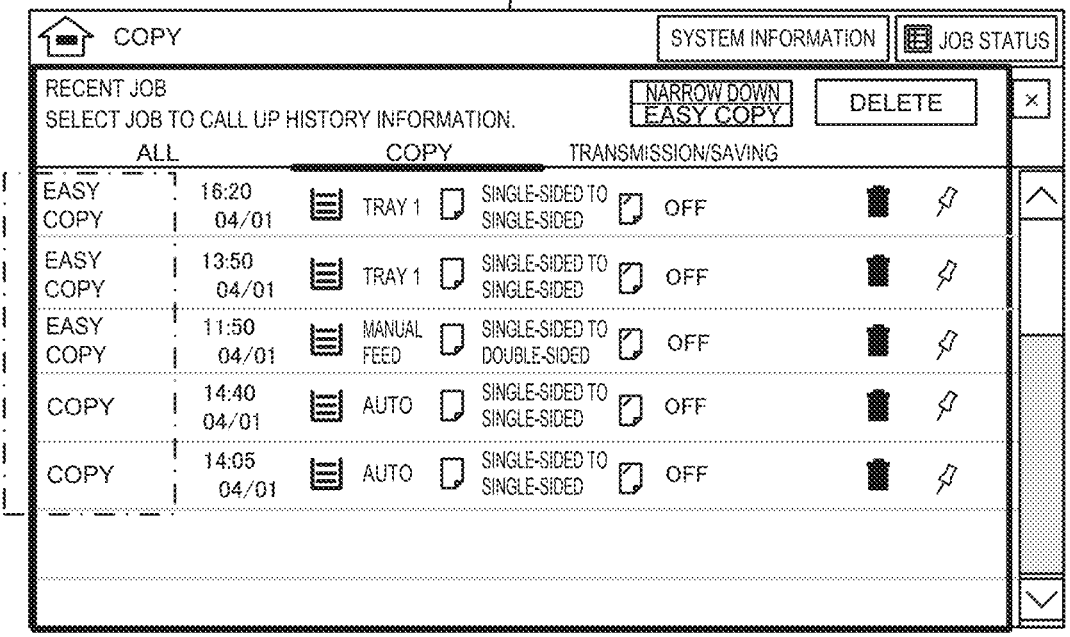
FIGS. 18A and 18B are diagrams for illustrating an operation example according to the third embodiment.
Figure 18B:
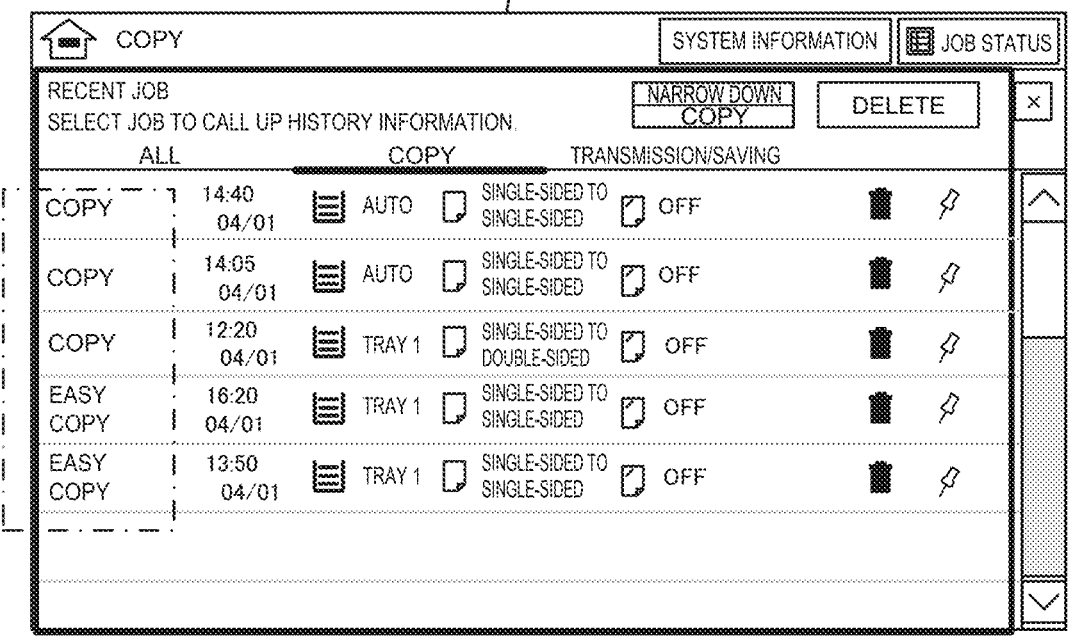

Next, an operation example according to the third embodiment will be described. FIG. 18A shows an operation example in which the number of items of easy copy history information that can be displayed on a history information display screen W42 is less than a predetermined number (total displayable number), and copy history information related to a different operation mode is displayed as a complement. FIG. 18B shows an operation example in which the number of items of copy history information that can be displayed on a history information display screen W62 is less than a predetermined number, and easy copy history information executed related to a different operation mode is displayed as a complement.

For example, in a case where the displayable number is ten, which is the number of items of history information that can be displayed on the history information display screen, but there are only three items of easy copy history information, the controller 11 determines whether or not there is any normal mode-related history information that can be displayed. Upon determining that there is normal mode-related history information that can be displayed as the remaining seven items, the controller 11 displays the normal copy history information on the history information display screen W42 after displaying the easy copy history information as shown in FIG. 18A (in an area enclosed by a dashed and dotted line in FIG. 18A).

For another example, in a case where the displayable number is ten, which is the number of items of history information that can be displayed on the history information display screen, but there are only three items of normal copy history information, the controller 11 determines whether or not there is any easy mode-related history information that can be displayed. Upon determining that there is easy mode-related history information that can be displayed as the remaining seven items, the controller 11 displays the easy copy history information on the history information display screen W62 after displaying the normal copy history information as shown in FIG. 18B (in an area enclosed by a dashed and dotted line in FIG. 18B).

FIGS. 19A to 19C show an operation example in which the number of items of history information that can be displayed on a history information display screen called up using the home screen W10 as a history information call screen is less than a predetermined number, and history information related to a different operation mode from a specified operation mode is displayed as a complement. Note that FIGS. 19A and 19B show the same situation as that shown in FIGS. 16A and 16B.

As in the example shown in FIG. 16B, a history information display screen W22 called up from the home screen W10 is provided with a narrow down button B284 illustrated in FIG. 19B, making it possible to change the screen being displayed from the history information display screen W22 to a history information display screen that displays specific history information.

In this example, as illustrated in FIG. 19C, "all", "copy priority", "easy copy priority", "e-mail priority", and "easy scan priority" operation modes are displayed in a selectable manner through the narrow down button B284 to allow specific history information to be preferentially displayed.

For example, in a case where the displayable number is ten, which is the number of items of history information that can be displayed on the history information display screen, but a selection of "copy priority" returns only three items of copy history information, and there is easy copy history information that can be displayed as the remaining seven items, the controller 11 displays the easy copy history information after displaying the copy history information.

In a case where there are only two items of easy copy history information, and there are five items of image transmission (easy scan or e-mail) history information, which is history information related to a different working mode (job type), the controller 11 may display the image transmission history information, i.e., the easy scan or e-mail history information, after displaying the copy history information and the easy copy history information.

As described above, according to the third embodiment, history information related to a different operation mode from a specified operation mode is displayed as a complement if the number of items of history information that can be otherwise displayed on a history information display screen is less than a predetermined number. Thus, it is possible to provide an image processing apparatus and the like that allows for an improvement in the convenience of history information retrieval and selection.

The present disclosure is not limited to the above-described embodiments, and various modifications may be made. That is, the technical scope of the present disclosure also includes embodiments that may be obtained by combining technical measures that are modified as appropriate without departing from the gist of the present disclosure.

Although some of the foregoing embodiments are described separately for convenience of explanation, it is needless to say that such embodiments may be combined and implemented within a technically allowable range.

The program(s) that operates on each of the devices in the foregoing embodiments is a program that controls the CPU or the like (program that causes a computer to function) so as to implement the functions according to the foregoing embodiments. The information handled by these devices is temporarily accumulated in a temporary storage device (for example, RAM) during the processing, is then stored in various storage devices such as read only memory (ROM) and an HDD, and is read, corrected, and written by the CPU as needed.

Here, a recording medium that stores the program may be, for example, any of a semiconductor medium (for example, ROM and a non-volatile memory card), an optical recording medium/magneto-optical recording medium (for example, a digital versatile disk (DVD), a magneto optical disk (MO), a Mini Disk (MD), a compact disk (CD), and a Blu-ray (registered trademark) Disk (BD)), and a magnetic recording medium (for example, a magnetic tape and a flexible disk). Furthermore, not only are the functions of the foregoing embodiments implemented through execution of the loaded program, but the functions of the present disclosure may also be implemented through processing performed in cooperation with, for example, an operating system or other application programs on the basis of instructions of the program.

For market distribution, the program may be stored and distributed in a portable recording medium or transferred to a server computer connected via a network such as the Internet. In this case, a storage device of the server computer is obviously included in the present disclosure.

What is claimed is:

1. An image processing apparatus comprising:
one or more controllers that execute a job by executing one or more instructions;
one or more storages that store therein the one or more instructions and history information pertaining to an execution of the job, the history information including a mode of operation when the job was executed, wherein
the one or more controllers:
preferentially display the history information corresponding to the mode of operation when the job was executed when calling up the history information,
display a basic screen through which a history information display instruction is received, and
preferentially display, upon receiving the history information display instruction through the basic screen, other history information different from the history information corresponding to the mode of operation.

2. The image processing apparatus according to claim 1, wherein the image processing apparatus, as the mode of the operation when the job was executed, has a normal operation mode in which a normal screen is used to receive an execution of a job and an easy operation mode in which a simple screen obtained through simplification of the normal screen is used to receive the execution of the job.

3. The image processing apparatus according to claim 1, wherein the image processing apparatus, as the mode of the operation when the job was executed, has a working mode in which an execution of an image transmission job is received.

4. The image processing apparatus according to claim 1, wherein in a case where a number of items of history information related to a specified operation mode and set to be displayed out of the history information stored in the one or more storages is less than a total displayable number in a predetermined display area, the one or more controllers additionally display history information related to mode of operation other than the specified operation mode out of the history information stored in the one or more storages.

5. The image processing apparatus according to claim 1, wherein the one or more controllers display only the history information corresponding to the mode of operation when the job was executed when calling up the history information.

6. The image processing apparatus according to claim 1, wherein the one or more controllers display the history information stored in the one or more storages regardless of the mode of operation when calling up the history information on a home screen.

7. A method for controlling an image processing apparatus including one or more storages, and one or more controllers, the method comprising:
- storing, in the one or more storages, history information pertaining to an execution of a job, the history information including a mode of operation when the job was executed;
- displaying preferentially the history information corresponding to the mode of operation when the job was executed when the one or more controllers call up the history information;
- displaying a basic screen through which a history information display instruction is received; and
- preferentially displaying, upon receiving the history information display instruction through the basic screen, other history information different from the history information corresponding to the mode of operation.

* * * * *